(12) United States Patent
Jackson

(10) Patent No.: US 8,370,495 B2
(45) Date of Patent: *Feb. 5, 2013

(54) ON-DEMAND COMPUTE ENVIRONMENT

(75) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/752,622

(22) Filed: Apr. 1, 2010

(65) Prior Publication Data

US 2010/0192157 A1   Jul. 29, 2010

Related U.S. Application Data

(63) Continuation of application No. 11/276,856, filed on Mar. 16, 2006, now Pat. No. 7,698,430.

(60) Provisional application No. 60/662,240, filed on Mar. 16, 2005.

(51) Int. Cl.
  *G06F 15/16* (2006.01)
  *G06F 9/46* (2006.01)

(52) U.S. Cl. ........................................ 709/226; 718/104

(58) Field of Classification Search .................... 709/225
  See application file for complete search history.

(56) References Cited

U.S. PATENT DOCUMENTS

| | | | |
|---|---|---|---|
| 4,215,406 A | 7/1980 | Gomola et al. | |
| 4,532,893 A | 8/1985 | Day et al. | |
| 4,553,202 A | 11/1985 | Trufyn | |
| 4,677,614 A | 6/1987 | Circo | |
| 4,943,932 A | 7/1990 | Lark et al. | |
| 5,299,115 A | 3/1994 | Fields et al. | |
| 5,349,682 A | 9/1994 | Rosenberry | |
| 5,377,332 A | 12/1994 | Entwistle et al. | |
| 5,701,451 A | 12/1997 | Rogers et al. | |
| 5,774,660 A | 6/1998 | Brendel et al. | |
| 5,826,239 A | 10/1998 | Du et al. | |
| 5,920,545 A | 7/1999 | Räsänen et al. | |
| 5,961,599 A | 10/1999 | Kalavade et al. | |
| 5,987,611 A | 11/1999 | Freund | |
| 6,006,192 A | 12/1999 | Cheng et al. | |
| 6,078,953 A | 6/2000 | Vaid et al. | |
| 6,108,662 A | 8/2000 | Hoskins et al. | |
| 6,161,170 A | 12/2000 | Burger et al. | |
| 6,175,869 B1 | 1/2001 | Ahuja et al. | |
| 6,195,678 B1 | 2/2001 | Komuro | |
| 6,201,611 B1 | 3/2001 | Carter et al. | |
| 6,202,080 B1 | 3/2001 | Lu et al. | |
| 6,226,677 B1 | 5/2001 | Slemmer | |
| 6,247,056 B1 | 6/2001 | Chou et al. | |

(Continued)

FOREIGN PATENT DOCUMENTS

| | | |
|---|---|---|
| CA | 2496783 | 3/2004 |
| EP | 0268435 B1 | 5/1988 |

(Continued)

OTHER PUBLICATIONS

US 7,774,482, 8/2010, Szeto et al. (withdrawn).

(Continued)

*Primary Examiner* — Krista Zele
*Assistant Examiner* — Margishi Desai

(57) ABSTRACT

An on-demand compute environment comprises a plurality of nodes within an on-demand compute environment available for provisioning and a slave management module operating on a dedicated node within the on-demand compute environment, wherein upon instructions from a master management module at a local compute environment, the slave management module modifies at least one node of the plurality of nodes.

36 Claims, 5 Drawing Sheets

U.S. PATENT DOCUMENTS

| | | | |
|---|---|---|---|
| 6,253,230 B1 | 6/2001 | Couland et al. |
| 6,314,114 B1 | 11/2001 | Coyle et al. |
| 6,317,787 B1 | 11/2001 | Boyd et al. |
| 6,327,364 B1 | 12/2001 | Shaffer et al. |
| 6,338,085 B1 | 1/2002 | Ramaswamy |
| 6,338,112 B1 | 1/2002 | Wipfel et al. |
| 6,345,287 B1 | 2/2002 | Fong et al. |
| 6,351,775 B1 | 2/2002 | Yu |
| 6,366,945 B1 | 4/2002 | Fong et al. |
| 6,370,584 B1 | 4/2002 | Bestavros et al. |
| 6,374,254 B1 | 4/2002 | Cochran et al. |
| 6,393,569 B1 | 5/2002 | Orenshteyn |
| 6,418,459 B1 | 7/2002 | Gulick |
| 6,438,125 B1 | 8/2002 | Brothers |
| 6,452,924 B1 | 9/2002 | Golden et al. |
| 6,463,454 B1 | 10/2002 | Lumelsky et al. |
| 6,466,980 B1 | 10/2002 | Lumelsky et al. |
| 6,571,215 B1 | 5/2003 | Mahapatro |
| 6,622,168 B1 | 9/2003 | Datta |
| 6,633,544 B1 | 10/2003 | Rexford et al. |
| 6,651,098 B1 | 11/2003 | Carroll et al. |
| 6,724,733 B1 | 4/2004 | Schuba et al. |
| 6,772,211 B2 | 8/2004 | Lu et al. |
| 6,779,016 B1 | 8/2004 | Aziz et al. |
| 6,781,990 B1 | 8/2004 | Puri et al. |
| 6,785,724 B1 | 8/2004 | Drainville et al. |
| 6,816,903 B1 | 11/2004 | Rakoshitz et al. |
| 6,816,905 B1 | 11/2004 | Sheets et al. |
| 6,857,020 B1 | 2/2005 | Chaar et al. |
| 6,862,606 B1 | 3/2005 | Major et al. |
| 6,868,097 B1 | 3/2005 | Soda et al. |
| 6,874,031 B2 | 3/2005 | Corbeil |
| 6,928,471 B2 | 8/2005 | Pabari et al. |
| 6,947,982 B1 | 9/2005 | McGann et al. |
| 6,971,098 B2 | 11/2005 | Khare et al. |
| 7,013,322 B2 | 3/2006 | Lahr |
| 7,020,719 B1 | 3/2006 | Grove et al. |
| 7,058,070 B2 | 6/2006 | Tran et al. |
| 7,082,606 B2 | 7/2006 | Wood et al. |
| 7,085,837 B2 | 8/2006 | Kimbrel et al. |
| 7,085,893 B2 | 8/2006 | Krissell et al. |
| 7,099,933 B1 | 8/2006 | Wallace et al. |
| 7,100,192 B1 | 8/2006 | Igawa et al. |
| 7,102,996 B1 | 9/2006 | Amdahl et al. |
| 7,124,289 B1 | 10/2006 | Suorsa |
| 7,126,913 B1 | 10/2006 | Patel et al. |
| 7,143,088 B2 | 11/2006 | Green et al. |
| 7,146,233 B2 | 12/2006 | Aziz et al. |
| 7,146,416 B1 | 12/2006 | Yoo et al. |
| 7,155,478 B2 | 12/2006 | Ims et al. |
| 7,177,823 B2 | 2/2007 | Lam et al. |
| 7,197,559 B2 | 3/2007 | Goldstein et al. |
| 7,206,819 B2 | 4/2007 | Schmidt |
| 7,216,173 B2 | 5/2007 | Clayton et al. |
| 7,225,249 B1 | 5/2007 | Barry et al. |
| 7,228,350 B2 | 6/2007 | Hong et al. |
| 7,231,445 B1 | 6/2007 | Aweya et al. |
| 7,251,688 B2 | 7/2007 | Leighton et al. |
| 7,278,142 B2 | 10/2007 | Bandhole et al. |
| 7,281,045 B2 | 10/2007 | Aggarwal et al. |
| 7,293,092 B2 | 11/2007 | Sukegawa |
| 7,305,464 B2 | 12/2007 | Phillipi et al. |
| 7,324,555 B1 | 1/2008 | Chen et al. |
| 7,328,406 B2 | 2/2008 | Kalinoski et al. |
| 7,334,230 B2 | 2/2008 | Chung et al. |
| 7,350,186 B2 | 3/2008 | Coleman et al. |
| 7,353,276 B2 | 4/2008 | Bain et al. |
| 7,356,655 B2 | 4/2008 | Allen et al. |
| 7,356,770 B1 | 4/2008 | Jackson |
| 7,373,391 B2 | 5/2008 | Iinuma |
| 7,373,524 B2 | 5/2008 | Motsinger et al. |
| 7,386,586 B1 | 6/2008 | Headley et al. |
| 7,386,611 B2 | 6/2008 | Dias et al. |
| 7,392,325 B2 | 6/2008 | Grove et al. |
| 7,398,216 B2 | 7/2008 | Barnett et al. |
| 7,415,709 B2 | 8/2008 | Hipp et al. |
| 7,418,518 B2 | 8/2008 | Grove et al. |
| 7,426,546 B2 | 9/2008 | Breiter et al. |
| 7,428,540 B1 | 9/2008 | Coates et al. |
| 7,437,460 B2 | 10/2008 | Chidambaran et al. |
| 7,437,730 B2 | 10/2008 | Goyal |
| 7,441,261 B2 | 10/2008 | Slater et al. |
| 7,454,467 B2 | 11/2008 | Girouard et al. |
| 7,461,134 B2 | 12/2008 | Ambrose |
| 7,467,225 B2 | 12/2008 | Anerousis et al. |
| 7,483,945 B2 | 1/2009 | Blumofe |
| 7,492,720 B2 | 2/2009 | Pruthi et al. |
| 7,502,884 B1 | 3/2009 | Shah |
| 7,503,045 B1 | 3/2009 | Aziz et al. |
| 7,516,221 B2 | 4/2009 | Souder et al. |
| 7,529,835 B1 | 5/2009 | Agronow et al. |
| 7,546,553 B2 | 6/2009 | Bozak et al. |
| 7,554,930 B2 | 6/2009 | Gaddis et al. |
| 7,583,607 B2 | 9/2009 | Steele et al. |
| 7,590,746 B2 | 9/2009 | Slater et al. |
| 7,590,747 B2 | 9/2009 | Coates et al. |
| 7,594,011 B2 | 9/2009 | Chandra |
| 7,596,784 B2 | 9/2009 | Abrams et al. |
| 7,610,289 B2 | 10/2009 | Muret et al. |
| 7,640,547 B2 | 12/2009 | Neiman et al. |
| 7,657,535 B2 | 2/2010 | Moyaux et al. |
| 7,668,809 B1 | 2/2010 | Kelly et al. |
| 7,685,281 B1 | 3/2010 | Saraiya et al. |
| 7,693,976 B2 | 4/2010 | Perry et al. |
| 7,693,993 B2 | 4/2010 | Sheets et al. |
| 7,694,305 B2 * | 4/2010 | Karlsson et al. .............. 718/105 |
| 7,698,386 B2 | 4/2010 | Amidon et al. |
| 7,698,398 B1 | 4/2010 | Lai |
| 7,701,948 B2 | 4/2010 | Rabie et al. |
| 7,716,334 B2 | 5/2010 | Rao et al. |
| 7,725,583 B2 | 5/2010 | Jackson |
| 7,743,147 B2 | 6/2010 | Suorsa et al. |
| RE41,440 E | 7/2010 | Briscoe et al. |
| 7,752,258 B2 | 7/2010 | Lewin et al. |
| 7,757,236 B1 * | 7/2010 | Singh ............................ 718/105 |
| 7,765,288 B2 | 7/2010 | Bainbridge et al. |
| 7,765,299 B2 | 7/2010 | Romero |
| 7,769,620 B1 | 8/2010 | Fernandez et al. |
| 7,774,331 B2 | 8/2010 | Barth et al. |
| 7,778,234 B2 | 8/2010 | Cooke et al. |
| 7,788,403 B2 | 8/2010 | Darugar et al. |
| 7,793,288 B2 | 9/2010 | Sameske |
| 7,796,619 B1 | 9/2010 | Feldmann et al. |
| 7,827,361 B1 * | 11/2010 | Karlsson et al. .............. 711/147 |
| 2002/0010783 A1 | 1/2002 | Primak et al. |
| 2002/0062377 A1 | 5/2002 | Hillman et al. |
| 2002/0091786 A1 | 7/2002 | Yamaguchi et al. |
| 2002/0107962 A1 | 8/2002 | Richter et al. |
| 2002/0116721 A1 | 8/2002 | Dobes et al. |
| 2002/0120741 A1 * | 8/2002 | Webb et al. .................... 709/225 |
| 2003/0014503 A1 | 1/2003 | Legout et al. |
| 2003/0014539 A1 | 1/2003 | Reznick |
| 2003/0050989 A1 | 3/2003 | Marinescu et al. |
| 2003/0069949 A1 | 4/2003 | Chan et al. |
| 2003/0097429 A1 | 5/2003 | Wu et al. |
| 2003/0097439 A1 | 5/2003 | Strayer et al. |
| 2003/0195931 A1 | 10/2003 | Dauger |
| 2003/0210694 A1 | 11/2003 | Jayaraman et al. |
| 2003/0231647 A1 | 12/2003 | Petrovykh |
| 2004/0010544 A1 | 1/2004 | Slater et al. |
| 2004/0010550 A1 | 1/2004 | Gopinath |
| 2004/0015579 A1 | 1/2004 | Cooper et al. |
| 2004/0039815 A1 * | 2/2004 | Evans et al. .................... 709/225 |
| 2004/0066782 A1 | 4/2004 | Nassar |
| 2004/0133665 A1 | 7/2004 | Deboer et al. |
| 2004/0143664 A1 | 7/2004 | Usa et al. |
| 2004/0179528 A1 | 9/2004 | Powers et al. |
| 2004/0181370 A1 * | 9/2004 | Froehlich et al. .............. 702/187 |
| 2004/0181476 A1 * | 9/2004 | Smith et al. ..................... 705/35 |
| 2004/0194098 A1 | 9/2004 | Chung et al. |
| 2004/0199621 A1 | 10/2004 | Lau |
| 2004/0199646 A1 | 10/2004 | Susai et al. |
| 2004/0218615 A1 | 11/2004 | Griffin et al. |
| 2004/0236852 A1 | 11/2004 | Birkestrand et al. |
| 2004/0260746 A1 | 12/2004 | Brown et al. |
| 2004/0267897 A1 | 12/2004 | Hill et al. |
| 2005/0021759 A1 | 1/2005 | Gupta et al. |

| | | |
|---|---|---|
| 2005/0021862 A1 | 1/2005 | Schroeder et al. |
| 2005/0022188 A1 | 1/2005 | Tameshige et al. |
| 2005/0027863 A1 | 2/2005 | Talwar et al. |
| 2005/0027865 A1 | 2/2005 | Bozak et al. |
| 2005/0038835 A1 | 2/2005 | Chidambaran et al. |
| 2005/0044228 A1 | 2/2005 | Birkestrand et al. |
| 2005/0049884 A1 | 3/2005 | Hunt et al. |
| 2005/0050057 A1 | 3/2005 | Mital et al. |
| 2005/0054354 A1 | 3/2005 | Roman et al. |
| 2005/0055322 A1 | 3/2005 | Masters et al. |
| 2005/0055694 A1 | 3/2005 | Lee |
| 2005/0055698 A1 | 3/2005 | Sasaki et al. |
| 2005/0080845 A1 | 4/2005 | Gopinath |
| 2005/0080891 A1 | 4/2005 | Cauthron |
| 2005/0114862 A1 | 5/2005 | Bisdikian et al. |
| 2005/0120160 A1 | 6/2005 | Plouffe et al. |
| 2005/0125213 A1 | 6/2005 | Chen et al. |
| 2005/0132378 A1 | 6/2005 | Horvitz et al. |
| 2005/0144315 A1 | 6/2005 | George et al. |
| 2005/0149940 A1 | 7/2005 | Calinescu et al. |
| 2005/0165925 A1* | 7/2005 | Dan et al. ............... 709/224 |
| 2005/0177600 A1 | 8/2005 | Eilam et al. |
| 2005/0188088 A1 | 8/2005 | Fellenstein et al. |
| 2005/0193103 A1 | 9/2005 | Drabik |
| 2005/0210470 A1 | 9/2005 | Chung et al. |
| 2005/0235150 A1 | 10/2005 | Kaler et al. |
| 2005/0246705 A1 | 11/2005 | Etelson et al. |
| 2005/0268063 A1 | 12/2005 | Diao et al. |
| 2005/0278760 A1* | 12/2005 | Dewar et al. ............... 725/94 |
| 2005/0288961 A1 | 12/2005 | Tabrizi |
| 2005/0289540 A1 | 12/2005 | Nguyen et al. |
| 2006/0015773 A1 | 1/2006 | Singh et al. |
| 2006/0028991 A1 | 2/2006 | Tan et al. |
| 2006/0031813 A1 | 2/2006 | Bishop et al. |
| 2006/0041444 A1 | 2/2006 | Flores |
| 2006/0048157 A1 | 3/2006 | Dawson et al. |
| 2006/0069671 A1 | 3/2006 | Conley et al. |
| 2006/0090136 A1 | 4/2006 | Miller et al. |
| 2006/0095917 A1 | 5/2006 | Black-Ziegelbein et al. |
| 2006/0117317 A1 | 6/2006 | Crawford et al. |
| 2006/0149695 A1 | 7/2006 | Bossman et al. |
| 2006/0159088 A1 | 7/2006 | Aghvami et al. |
| 2006/0168107 A1 | 7/2006 | Balan et al. |
| 2006/0168224 A1 | 7/2006 | Midgley |
| 2006/0227810 A1 | 10/2006 | Childress et al. |
| 2006/0251419 A1 | 11/2006 | Zadikian et al. |
| 2006/0294238 A1 | 12/2006 | Naik et al. |
| 2007/0050777 A1 | 3/2007 | Hutchinson et al. |
| 2007/0083899 A1* | 4/2007 | Compton et al. ............ 725/87 |
| 2007/0094691 A1 | 4/2007 | Gazdzinski |
| 2007/0124344 A1 | 5/2007 | Rajakannimariyan et al. |
| 2007/0155406 A1 | 7/2007 | Dowling et al. |
| 2007/0180380 A1 | 8/2007 | Khavari et al. |
| 2007/0264986 A1 | 11/2007 | Warrillow et al. |
| 2007/0271375 A1 | 11/2007 | Hwang |
| 2008/0104231 A1 | 5/2008 | Dey et al. |
| 2008/0255953 A1 | 10/2008 | Chang et al. |
| 2009/0070771 A1 | 3/2009 | Yuyitung et al. |
| 2009/0100133 A1 | 4/2009 | Giulio et al. |
| 2009/0105059 A1 | 4/2009 | Dorry et al. |
| 2009/0234962 A1 | 9/2009 | Strong et al. |
| 2009/0235104 A1 | 9/2009 | Fung |
| 2009/0292824 A1 | 11/2009 | Marashi et al. |
| 2009/0327489 A1 | 12/2009 | Swildens et al. |
| 2010/0103837 A1 | 4/2010 | Jungck et al. |
| 2010/0153546 A1 | 6/2010 | Clubb et al. |
| 2010/0217801 A1 | 8/2010 | Leighton et al. |
| 2010/0235234 A1 | 9/2010 | Shuster |

FOREIGN PATENT DOCUMENTS

| | | |
|---|---|---|
| EP | 1331564 A1 | 7/2003 |
| EP | 1365545 A1 | 11/2003 |
| EP | 1492309 A3 | 12/2004 |
| EP | 1865684 A1 | 12/2007 |
| GB | 2391744 A | 2/2004 |
| KR | 2004/0107934 | 12/2004 |
| WO | WO 98/11702 | 3/1998 |
| WO | WO 99/57660 | 11/1999 |
| WO | WO 00/14938 | 3/2000 |
| WO | WO 00/60825 | 10/2000 |
| WO | WO 01/09791 | 2/2001 |
| WO | WO 01/14987 | 3/2001 |
| WO | WO 01/15397 | 3/2001 |
| WO | WO 01/39470 | 5/2001 |
| WO | WO 03/046751 | 6/2003 |
| WO | WO 2004/070547 | 8/2004 |
| WO | WO 2004/092884 | 10/2004 |
| WO | WO 2005/017783 | 2/2005 |
| WO | WO 2006/036277 | 4/2006 |

OTHER PUBLICATIONS

Chandra, Abhishek et al., "Quantifying the Benefits of Resource Multiplexing in On-Demand Data Centers", Department of Computer Science, University of Massachusetts Amherst, 2003.

Rolia, Jerome et al., "Adaptive Internet Data Centers", Hewlett Packard Labs, Palo Alto, CA, USA, 2000.

Chase, Jeffrey et al., "Dynamic Virtual Clusters in a Grid Site Manager", Department of Computer Science, Duke University, Box 30129, Durham, NC 27708, USA. 2003.

Doyle, Ronald et al., "Model-Based Resource Provisioning in a Web Service Utility", IBM, Research Triangle Park, Department of Computer Science, Duke University, 2003.

Bradford, Lindsay et al., "Experience Using a Coordination-based Architecture for Adaptive Web Content Provision", Centre for Information Technology Innovation, Queensland University of Technology, Australia, 2005.

Ranjan, S. et al., "QoS-Driven Server Migration for Internet Data Centers", In Proceedings of IWQoS, 2002.

Russell, Clark, et al., "Providing Scalable Web Service Using Multicast Delivery", College of Computing, Georgia Institute of Technology, Atlanta, GA 30332-0280, 1995.

Reed, Daniel et al., "The Next Frontier: Interactive and Closed Loop Performance Steering", Department of Computer Science, University of Illinois, Urbana, Illinois 61801, International Conference on Parallel Processing Workshop, 1996.

Bian, Qiyong, et al., "Dynamic Flow Switching, A New Communication Service for ATM Networks", 1997.

Feldmann, Anja, et al., "Reducing Overhead in Flow-Switched Networks: An Empirical Study of Web Traffic", AT&T Labs—Research, Florham Park, NJ, 1998.

Feldmann, Anja, et al., "Efficient Policies for Carrying Web Traffic Over Flow-Switched Networks", IEEE/ACM Transactions on Networking, vol. 6, No. 6, Dec. 1998.

Feng, Chen, et al., "Replicated Servers Allocation for Multiple Information Sources in a Distributed Environment", Department of Computer Science, Hong Kong University of Science and Technology, Clear Water Bay, Kowloon, Hong Kong, Sep. 2000.

Wang, Z., et al., "Resource Allocation for Elastic Traffic: Architecture and Mechanisms", Bell Laboratories, Lucent Technologies, Network Operations and Management Symposium, 2000. 2000 IEEE/IFIP, pp. 157-170, Apr. 2000.

Fan, Li, et al., "Summary Cache: A Scalable Wide-Area Web Cache Sharing Protocol", IEEE/ACM Transactions on networking, vol. 8, No. 3, Jun. 2000.

Yang, Chu-Sing, et al., "Building an Adaptable, Fault Tolerant, and Highly Manageable Web Server on Clusters of Non-dedicated Workstations", Department of Computer Science and Engineering, National Sun Yat-Sen University, Kaohsiung, Taiwan, R.O.C.. 2000.

Appleby, K., et. al., "Oceano—SLA Based Management of a Computing Utility", IBM T.J. Watson Research Center, P.O.Box 704, Yorktown Heights, New York 10598, USA. Proc. 7th IFIP/IEEE Int'l Symp. Integrated Network Management, IEEE Press 2001.

Abdelzaher, Tarek, et al., "Performance Guarantees for Web Server End-Systems: A Control—Theoretical Approach", IEEE Transactions on Parallel and Distributed Systems, vol. 13, No. 1, Jan. 2002.

Garg, Rahul, et al., "A SLA Framework for QoS Provisioning and Dynamic Capacity Allocation", 2002.

Xu, Jun, et al., "Sustaining Availability of Web Services under Distributed Denial of Service Attacks", IEEE Transactions on Computers, vol. 52, No. 2, pp. 195-208, Feb. 2003.

McCann, Julie, et al., "Patia: Adaptive Distributed Webservor (A Position Paper)", Department of Computing, Imperial College London, SW1 2BZ, UK. 2003.

Urgaonkar, Bhuvan, et al., "Sham: Managing CPU and Network Bandwidth in Shared Clusters", IEEE Transactions on Parallel and Distributed Systems, vol. 15, No. 1, pp. 2-17, Jan. 2004.

Liao, Raymond, et al., "Dynamic Core Provisioning for Quantitative Differentiated Services", IEEE/ACM Transactions on Networking, vol. 12, No. 3, pp. 429-442, Jun. 2004.

Amini, Lisa, et al., "Effective Peering for Multi-provider Content Delivery Services", IBM Research, Hawthorne, New York, Columbia University, New York, New York. 2004.

Soldatos, John, et al., "On the Building Blocks of Quality of Service in Heterogeneous IP Networks", IEEE Communications Surveys, The Electronic Magazine of Original Peer-Reviewed Survey Articles, vol. 7, No. 1. First Quarter 2005.

Devarakonda, Murthy, et al., "Policy-Based Multi-Datacenter Resource Management", IBM Research, P.O,Box 704, Yorktown Hts, NY, Sixth IEEE International Workshop on Policies for Distributed Systems and Networks, pp. 247-250, Jun. 2005.

Rashid, Mohammad, et al., "An Analytical Approach to Providing Controllable Differentiated Quality of Service in Web Servers", IEEE Transactions on Parallel and Distributed Systems, vol. 16, No. 11, pp. 1022-1033, Nov. 2005.

Braumandl, R. et al., "ObjectGlobe: Ubiquitous query processing on the Internet", Universität Passau, Lehrstuhl für Informatik, 94030 Passau, Germany. Technische Universität München, Institut für Informatik, 81667 München, Germany. Edited by F. Casati, M.-C. Shan, D. Georgakopoulos, Accepted: Mar. 14, 2001.Published online: Jun. 7, 2001—c Springer-Verlag 2001.

Kai, Shen, et al., "Supporting Ciuster-based Network Services on Functionally Symmetric Software Architecture", Proceedings of the 2004 ACM/IEEE conference on Supercomputing, 2004.

Benkner, Siegfried, et al., "VGE—A Service-Oriented Grid Environment for On-Demand Supercomputing", Institute for Software Science, University of Vienna, Nordbergstrasse 15/C/3, A-1090 Vienna, Austria, Proceedings of the 5th IEEE/ACM International Workshop on Grid Computing, pp. 11-18. 2004.

Amir, YAR1 et al,, "WALRUS—a Low Latency, High Throughput Web Service Using Internet-wide Repiication", Department of Computer Science, The Johns Hopkins University, 1998.

Azuma, K, et al., "Design, Implementation and Evaluation of Resource Management System for Internet Servers", Journal of High Speed Networking, IOS Press, vol. 14, No. 4/2005, Oct. 2005.

Baentsch, Michael et al., "World Wide Web Caching: The Application-Level View of the Internet", Communications Magazine, IEEE, vol. 35, Issue 6, pp. 170-178, Jun. 1997.

Banga, Gaurav et al., "Resource Containers: A New Facility for Resource Management in Server Systems", Rice University, orginally published in the Proceedings of the 3$^{rd}$ Symposium on Operating Systems Design and Implementation, New Orleans, Louisiana, Feb. 1999.

Bellolim, A. et al., "A Scalable Web Server Architecture", World Wide Web: Internet and Web Information Systems, 5, 5-23, 2002 Kluwer Academic Pubiishers. Manufactured in The Netherlands, 2000.

Cardellini, Valeria et al., "Geographic Load Balancing for Scalable Distributed Web Systems", Proceedings of the 8th International Symposium on Modeling. Analysis and Simulation of Computer and Telecommunication Systems, pp. 20-27. 2000.

Casalicchio, Emiliano, et al., "Static and Dynamic Scheduling Algorithms for Scalable Web Server Farm", University of Roma Tor Vergata, Roma, Italy, 00133. 2001.

Chase, Jeffrey et al., "Dynamic Virtual Clusters in a Grid Site Manager", Department of Computer Science, Duke University, Box 90129, Durham, NC 27708, U.S.A. Proceedings of the 12th IEEE International Symposium on High Performance Distributed Computing, 2003.

Chawla, Hamesh et al., "HydraNet: Network Support for Scaling of Large-Scale Services", Proceedings of 7th International Conference on Computer Communications and Networks, Oct. 1998.

Chen, Xiangping et al., "Performance Evaluation of Service Differentiating Internet Servers", IEEE Transactions on Computers, vol. 51, No. 11, pp. 1368-1375. Nov. 2002.

Chu, Wesley et al., "Taks Allocation and Precedence Relations for Distributed Real-Time Systems", IEEE Transactions on Computers, vol. C-36, No. 6, pp. 667-679. Jun. 1987.

Clarke, Michael et al,, "An Architecture for Dynamically Extensible Operating Systems", Distributed Multimedia Research Group, Department of Computing, Lancaster University, Bailrigg, Lancaster, LA1 4YR, U.K. Proceedings on Fourth International Conference on Configurable Distributed Systems. May 1998.

Colajanni, Michele et al., "Dynamic Load Balancing in Geographically Distributed Heterogeneous Web Servers", Dip. di Informatica. Sistemi e Produzione, Universita di Roma, Tor Vergata, Roma, Italy 00133, 18$^{th}$ International Conference on Distributed Computing Systems, pp. 295-302, May 1998.

Colajanni, Michele et al., "Analysis of Task Assignment Policies in Scalable Distributed Web-server Systems", IEEE Transactions on Parallel and Distributed Systes, vol. 9, No. 6, Jun. 1998.

Conti, Marco, et al., "Client-side content delivery policies in replicated web services: parallel access versus single server approach", Istituto di Informatica e Telematica (IIT), Italian National Research Council (CNR), Via G. Moruzzi, I. 56124 Pisa, Italy, Performance Evaluation 59 (2005) 137-157, Available online Sep. 11, 2004.

Dilley, John, et al., "Globaily Distributed Content Delivery", IEEE Internet Computing, 1089-7801/02/$17.00 © 2002 IEEE, pp. 50-58, Sep.-Oct. 2002.

Ercetin, Ozgur et al., "Market-Based Resource Allocation for Content Delivery in the Internet", IEEE Transactions on Computers, vol. 52, No. 12, pp. 1573-1585, Dec. 2003.

Fong, L.L. et al., "Dynamic Resource Management in an eUtility", IBM T. J. Watson Research Center, 0-7803-7382-0/02/$17.00 © 2002 IEEE.

Foster, Ian et al., "The Anatomy of the Grid-Enabling Scalable Virtual Organizations", To appear: Intl J. Supercomputer Applications, 2001.

Gayek, P., et al., "A Web Content Serving Utility", IBM Systems Journal, vol. 43, No. 1, pp. 43-63. 2004.

Genova, Zornitza et al., "Challenges in URL Switching for Implementing Globally Distributed Web Sites", Department of Computer Science and Engineering, University of South Florida, Tampa, Florida 33620. 0-7695-077 I-9/00 $10.00-IEEE. 2000.

Guo, Jiani et al., "QoS Aware Job Scheduling in a Cluster-based Web Server for Multimedia Applications", Computer Science and Engineering, University of California, Riverside, CA 92521, 0-7695-2312-9/05/$20.00 (c) 2005 IEEE.

Hu, E.C. et al., "Adaptive Fast Path Architecture", Copyright 2001 by International Business Machines Corporation, pp. 191-206, IBM J. Res. & Dev. vol. 45 No. 2 Mar. 2001.

Huang, Chengdu, et al,, "An Architecture for Real-Time Active Content Distribution", Proceedings of the 12th 16th Euromicro Conference on Real-Time Systems (ECRTS'04), 1068-3070/04 $20.00 © 2004 IEEE.

Jann, Joefon et al., "Web Applications and Dynamic Reconfiguration in UNIX Servers", IBM, Thomos J. Watson Research Center, Yorktown' Heights, New York 10598, 0-7803-7756-7/03/$17.00. 2003 IEEE. pp. 186-194.

Jiang, Xuxian et al., "SODA: a Service-On-Demand Architecture for Application Service Hosting Utility Platforms", Proceedings of the 12th IEEE International Symposium on High Performance Distributed Computing (HPDC'03) 1082-8907/03 $17.00 © 2003 IEEE.

Kant, Krishna et al., "Server Capacity Planning for Web Traffic Workload", IEEE Transactions on Knowledge and Data Engineering, vol. 11, No. 5, Sep./Oct. 1999, pp. 731-474.

Kapitza, Rudiger et al., "Decentralized, Adaptive Services: The AspectIX Approach for a Flexible and Secure Grid Environment", M. Jeckle, R. Kowalczyk, and P. Braun (Eds.): GSEM 2004, LNCS 3270, pp. 107-118, 2004. © Springer-Verlag Berlin Heidelberg 2004.

Koulopoulos, D. et al., "PLEIADES: An Internet-based parallel/distributed system", Software—Practice and Experience 2002; 32:1035-1049 (DOI: 10.1002/spe.468).

Kuz, Ihor et al., Delft University of Technology Vrije Universiteit Vrije Universiteit Delft, The Netherlands, 0-7695-0819-7/00 $10.00 0 2000 IEEE.
Lu, Chenyang et al., "A Feedback Control Approach for Guaranteeing Relative Delays in Web Servers", Department of Computer Science, University of Virginia, Charlottesville, VA 22903, 0-7695-1134-1/01 $10.00. 2001 IEEE.
Mahon, Rob et al., "Cooperative Design in Grid Services", The 8th International Conference on Computer Supported Cooperative Work in Design Proceedings, pp. 406-412. IEEE 2003.
Montez, Carlos et al., "Implementing Quality of Service in Web Servers", LCMI—Depto de Automacao e Sisternas—Univ. Fed. de Santa Catarina, Caixa Postal 476-88040-900—Florianopolis—SC—Brasil, 1060-9857/02 $17.00. 2002 IEEE.
Haddad, Ibrahim et al., "MOSIX: A Cluster Load-Balancing Solution for Linux", Linux Journal, vol. 2001, Issue 85es, Article No. 6, May 2001.
Naik, Vijay et al., "Adaptive Resource Sharing in a Web Services Environment", Middleware Conference, vol. 78, Proceedings of the $5^{th}$ ACM/IFIP/USENIX international conference on Middleware, pp. 311-330. 2004.
Nakrani, Sunil et al., "On Honey Bees and Dynamic Server Allocation in Internet Hosting Centers", Computing Laboratory, University of Oxford, Oxford OX1 3QD, England, UK Copyright © 2004 International Society for Adaptive Behavior, vol. 12(3-4): pp. 223-240. 2004.
Abdelwahed, Sherif et al., "A Control-Based Framework for Self-Managing Distributed Computing Systems", WOSS'04 Oct. 31-Nov. 1, 2004 Newport Beach, CA, USA. Copyright 2004 ACM 1-58113-989-6/04/0010.
Aweya, James et al., "An adaptive load balancing scheme for web servers", International Journal of Network Management 2002; 12: 3-39 (DOI: 10.1002/nem.421), Copyright 2002 John Wiley & Sons, Ltd.
Chen, Liang et al., "Resource Allocation in a Middleware for Streaming Data", 2nd Workshop on Middleware for Grid Computing Toronto, Canada, pp. 5-10. Copyright 2004 ACM.
Workshop on Performance and Architecture of Web Servers (PAWS-2000) Jun. 17-18, 2000, Santa Clara, CA (Held in conjunction with SIGMETRICS-2000).
Hadjiefthymiades, Stathes et al., "Using Proxy Cache Relocation to Accelerate Web Browsing in Wireless/Mobile Communications", University of Athens, Dept. of Informatics and Telecommunications, Panepistimioupolis, Ilisia, Athens, 15784, Greece. WWW10, May 1-5, 2001, Hong Kong.
Fox, Armando et al., "Cluster-Based Scalable Network Services", University of California at Berkeley. SOSP-16 Oct. 1997 Saint-Malo, France, ACM 1997.
Chen, Thomas, "Increasing the Observability of Internet Behavior", Communications of the ACM, vol. 44, No. 1, pp. 93-98, Jan. 2001.
Shaikh, Anees et al,, "Implementation of a Service Platform for Online Games", Network Software and Services, IBM T.J. Watson Research Center, Hawthorne, NY 10532, SIGCOMM'04 Workshops, Aug. 30 & Sep. 3, 2004, Portland, Oregon, USA. Copyright 2004 ACM.
Chellappa, Ramnath et al., "Managing Computing Resources in Active Intranets", International Journal of Network Management, 2002, 12:117-128 (DOI:10.1002/nem.427).
Lowell, David et al., "Devirtualizable Virtual Machines Enabling General, Single-Node, Online Maintance", ASPLOS'04, Oct. 9-13, 2004, Boston, Massachusetts, USA. pp. 211-223, Copyright 2004 ACM.
Shen, Kai et al., "Integrated Resource Management for Cluster-based Internet Services", USENIX Association, $5^{th}$ Symposium on Operating Systems Design and Implementation. vol. 36, Issue SI (Winter 2002), pp. 225-238. 2002.
Cardellini, Valeria et al., "The State of the Art in Locally Distributed Web-Server Systems", ACM Computing Surveys, vol. 34, No. 2, Jun. 2002, pp. 263-311.
Grajcar, Martin, "Genetic List Scheduling Algorithm for Scheduling and Allocation on a Loosely Coupled Heterogeneous Multiprocessor System", Proceedings of the $36^{th}$ annual ACM/IEEE Design Automation Conference, New Orleans, Louisiana, pp. 280-285. 1999.
Chandra, Abhishek et al., "Dynamic Resource Allocation for Shared Data Centers Using Online Measurements" Proceedings of the 11th international conference on Quality of service, Berkeley, CA, USA pp. 381-398. 2003.

Grimm, Robert et al,, "System Support for Pervasive Applications", ACM Transactions on Computer Systems, vol. 22, No. 4, Nov. 2004, pp. 421-486.
Bent, Leeann et al., "Characterization of a Large Web Site Population with Implications for Content Delivery", WWW2004, May 17-22, 2004, New York, New York, USA ACM 1-58113-844-X/4/0005, pp. 522-533.
Pacifici, Giovanni et al., "Performance Management for Cluster Based Web Services", IBM TJ Watson Research Center, May 13, 2003.
Conti, Marco et al., "Quality of Service Issues in Internet Web Services", IEEE Transactions on Computers, vol. 51, No. 6, pp. 593-594, Jun. 2002.
Raunak, Mohammad et al., "Implications of Proxy Caching for Provisioning Networks and Servers", IEEE Journal on Selected Areas in Communications, vol. 20, No. 7, pp. 1276-1289, Sep. 2002.
Reumann, John et al., "Virtual Services: A New Abstraction for Server Consolidation", Proceedings of 2000 USENIX Annual Technical Conference, San Diego, California, Jun. 18-23, 2000.
Rolia, J. et al., "Resource Access Management for a Utility Hosting Enterprise Applications", IFIP/IEEE Eighth International Symposium on Integrated Network Management, pp. 549-562, Mar. 2003.
Ryu, Kyung Dong et al., "Resource Policing to Support Fine-Grain Cycle Stealing in Networks of Workstations", IEEE Transactions on Parallel and Distributed Systems, vol. 15, No. 10, pp. 878-892, Oct. 2004.
Sacks, Lionel et al., "Active Robust Resource Management in Cluster Computing Using Policies", Journal of Network and Systems Management, vol. 11, No. 3, pp. 329-350, Sep. 2003.
Sit, Yiu-Fai et al., "Cyclone: A High-Performance Cluster-Based Web Server with Socket Cloning", Department of Computer Science and Information Systems, The University of Hong Kong, Cluster Computing 7, 21-37, 2004. Kluwer Academic Publishers.
Sit, Yiu-Fai et al., "Socket Cloning for Cluster-BasedWeb Servers", Department of Computer Science and Information Systems, The University of Hong Kong, Proceedings of the IEEE International Conference on Cluster Computing, IEEE 2002.
Snell, Quinn et al., "An Enterprise-Based Grid Resource Management System", Brigham Young University, Provo, Utah 84602, Proceedings of the 11th IEEE International Symposium on High Performance Distributed Computing, 2002.
Tang, Wenting et al., "Load Distribution via Static Scheduling and Client Redirection for Replicated Web Servers", Department of Computer Science and Engineering, 3115 Engineering Building, Michigan State University, East Lansing, MI 48824-1226, Proceedings of the 2000 International Workshop on Parallel Processing, pp. 127-133, IEEE 2000.
Taylor, Steve et al., "Grid Resources for Industrial Applications", Proceedings of the IEEE International Conference on Web Services. 2004.
Vidyarthi, Deo Prakash et al., "Cluster-Based Multiple Task Allocation in Distributed Computing System", Proceedings of the 18th International Parallel and Distributed Processing Symposium, IEEE 2004.
Villela, Daniel et al., "Provisioning Servers in the Application Tier for E-commerce Systems", pp. 57-66, IEEE 2004.
Xu, Zhiwei et al., "Cluster and Grid Superservers: The Dawning Experiences in China", Institute of Computing Technology, Chinese Academy of Sciences, P.O. Box 2704, Beijing 100080, China. Proceedings of the 2001 IEEE International Conference on Cluster Computing. IEEE 2002.
Zeng, Daniel et al., "Efficient Web Content Delivery Using Proxy Caching Techniques", IEEE Transactions on Systems, Man, and Cybernetics—Part C: Applications and Reviews, vol. 34, No. 3, pp. 270-280, Aug. 2004.
Zhang, Qian et al., "Resource Allocation for Multimedia Streaming Over the Internet", IEEE Transactions on Multimedia, vol. 3, No. 3, pp. 339-355, Sep. 2001.
U.S. Appl. No. 60/662,240, filed Nov. 1985, Trufyn.
U.S. Appl. No. 11/279,007, filed Jul. 2000, Smith et al.
Gupta et al., "Provisioning a virtual private network: a network design problem for multicommodity flow", Proceedings of the thirty-third annual ACM symposium on Theory of computing [online], Jul. 2001, pp. 389-398, abstract [retrieved on Jun. 14, 2007]. Retrieved from the Internet: URL:http://portal.acm.org/citation.crm?id=380830&dl=ACM&coll=GUIDE.

* cited by examiner

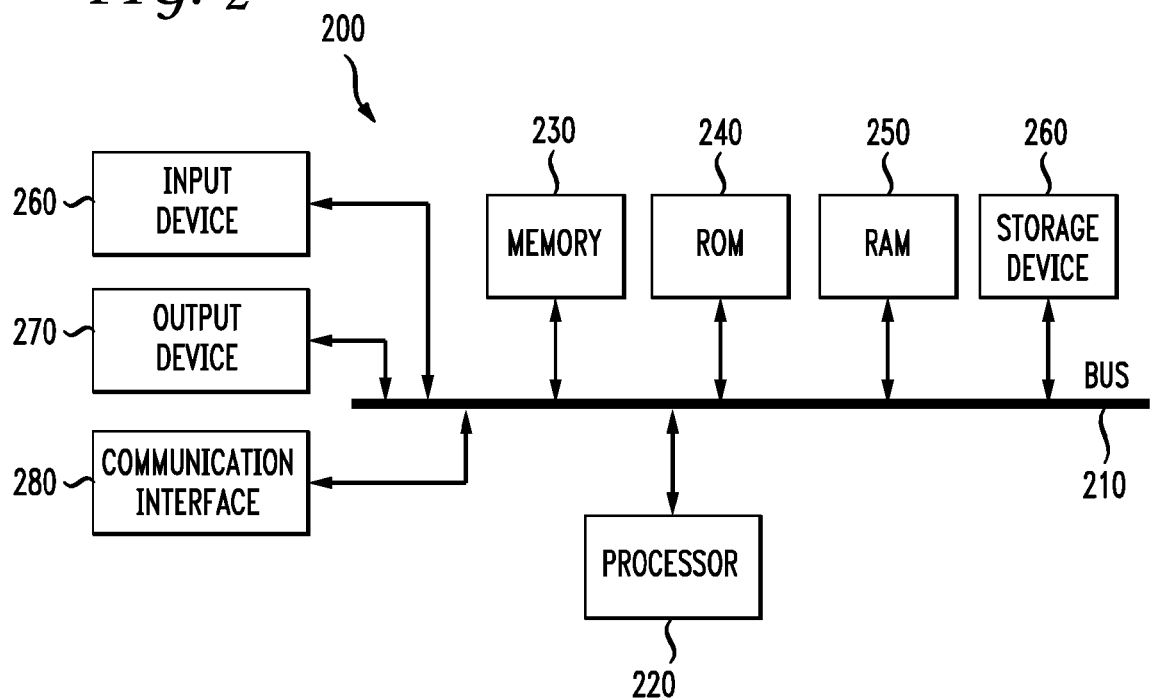
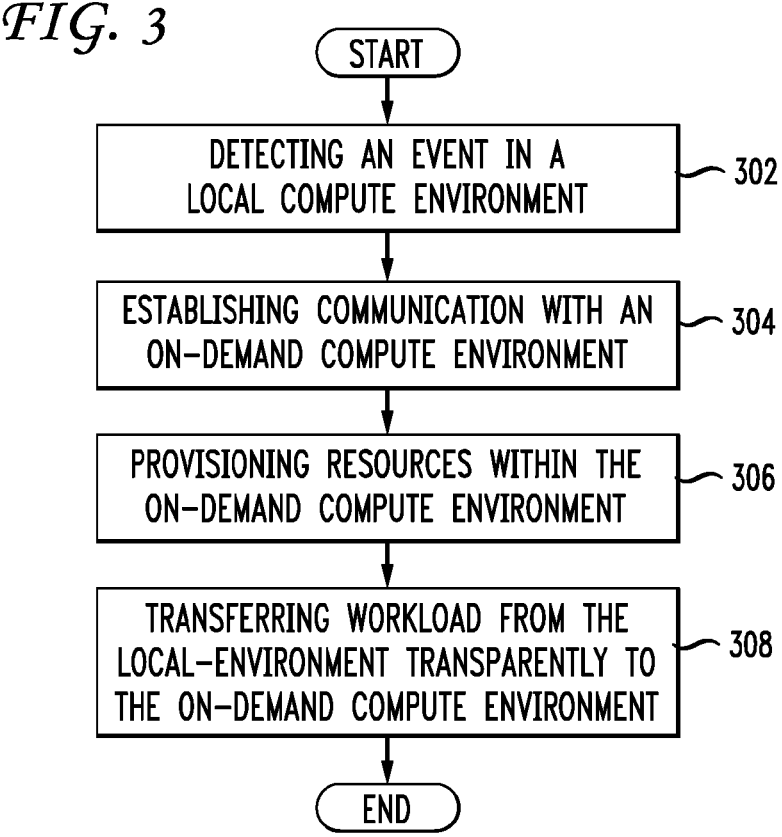

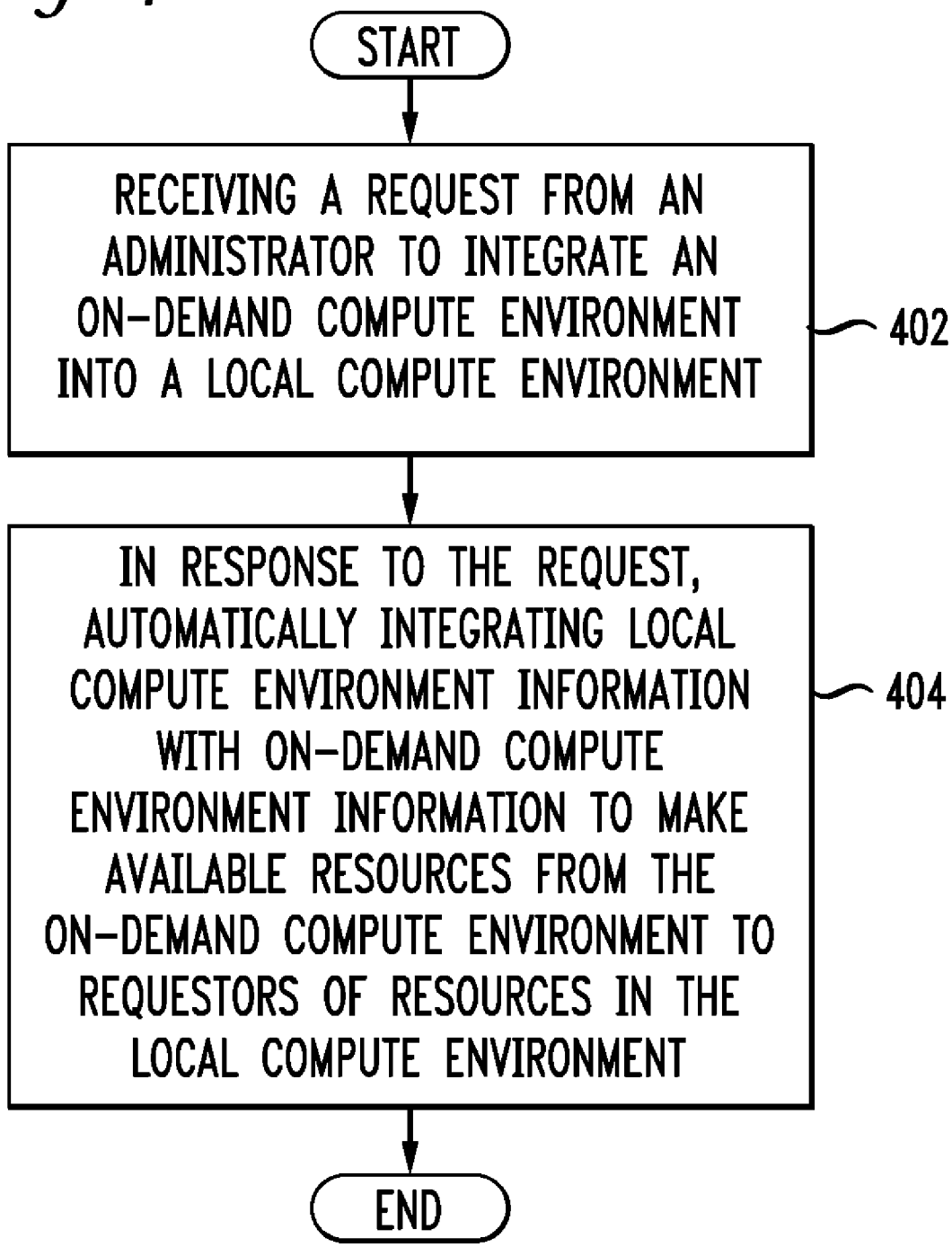

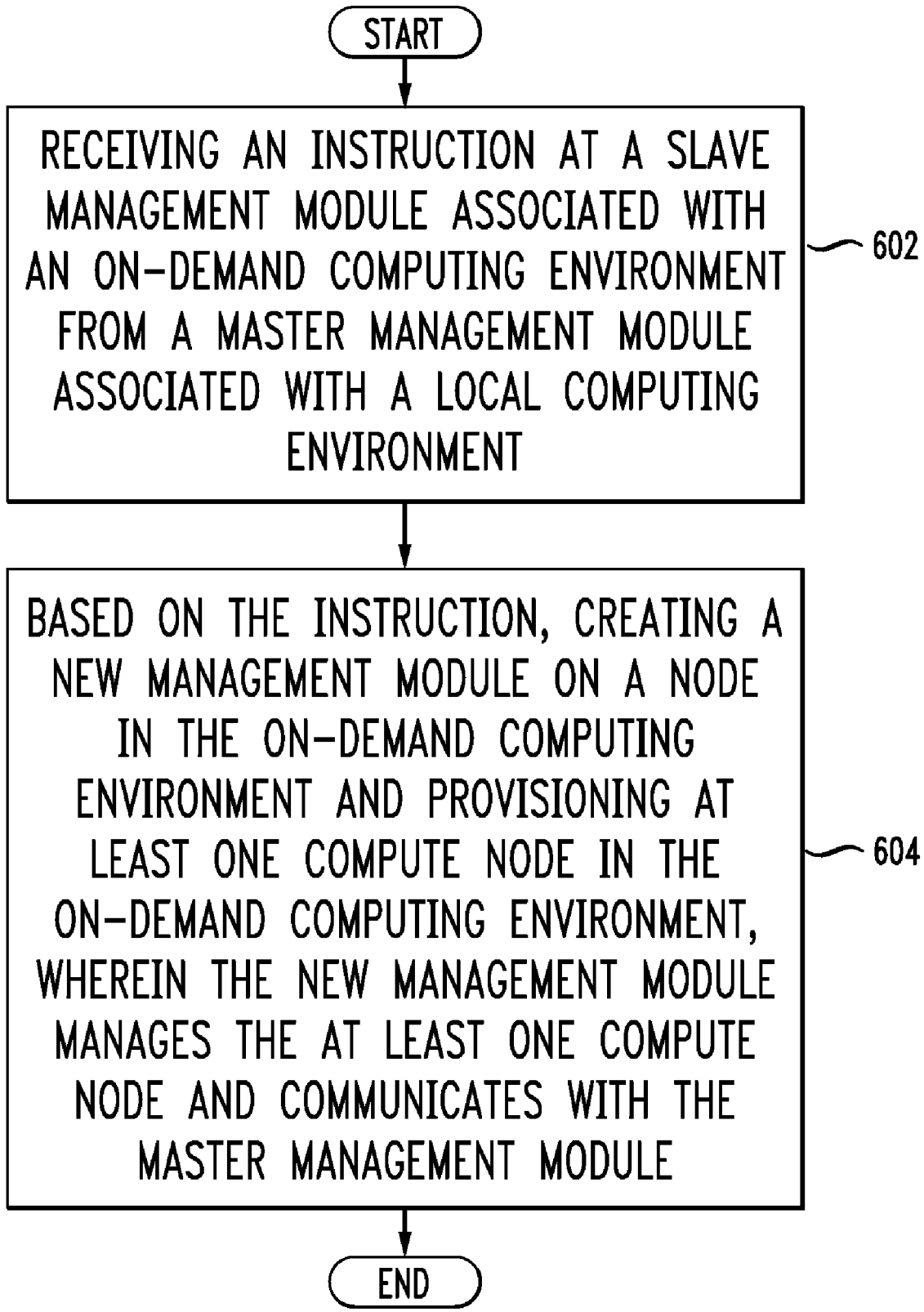

ON-DEMAND COMPUTE ENVIRONMENT

PRIORITY CLAIM

The present application is a continuation of U.S. patent application Ser. No. 11/276,856, filed Mar. 16, 2006, which claims priority to U.S. Provisional Application No. 60/662,240 filed Mar. 15, 2005, the contents of which are incorporated herein by reference.

RELATED APPLICATION

The present application is related to U.S. application Ser. No. 11/276,852 incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND OF THE INVENTION

1. Field of the Invention

The present invention relates to a resource management system and more specifically to a system and method of providing access to on-demand compute resources.

2. Introduction

Managers of clusters desire maximum return on investment often meaning high system utilization and the ability to deliver various qualities of service to various users and groups. A cluster is typically defined as a parallel computer that is constructed of commodity components and runs as its system software commodity software. A cluster contains nodes each containing one or more processors, memory that is shared by all of the processors in the respective node and additional peripheral devices such as storage disks that are connected by a network that allows data to move between nodes. A cluster is one example of a compute environment. Other examples include a grid, which is loosely defined as a group of clusters, and a computer farm which is another organization of computer for processing.

Often a set of resources organized in a cluster or a grid may have jobs to be submitted to the resources that require more capability than the set of resource has available. In this regard, there is a need in the art for being able to easily, efficiently and on-demand be able to utilize new resources or different resources to handle a job. The concept of "on-demand" compute resources has been developing in the high performance computing community recently. An on-demand computing environment enables companies to procure compute power for average demand and then contract remote processing power to help in peak loads or to offload all their compute needs to a remote facility. Several reference books having background material related to on-demand computing or utility computing include Mike Ault, Madhu Tumma, *Oracle 10 g Grid & Real Application Clusters*, Rampant TechPress, 2004 and Guy Bunker, Darren Thomson, *Delivering Utility Computing Business-driven IT Optimization*, John Wiley & Sons Ltd, 2006.

In Bunker and Thompson, section 3.3 on page 32 is entitled "Connectivity: The Great Enabler" wherein they discuss how the interconnecting of computers will dramatically increase their usefulness. This disclosure addresses that issue. There exists in the art a need for improved solutions to enable communication and connectivity with an on-demand high performance computing center.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention include, but are not limited to, methods, systems, computing devices, clusters, grids and computer-readable media that perform the processes and steps described herein.

An on-demand compute environment comprises a plurality of nodes within an on-demand compute environment available for provisioning and a slave management module operating on a dedicated node within the on-demand compute environment, wherein upon instructions from a master management module at a local compute environment, the slave management module modifies at least one node of the plurality of nodes. Methods and computer readable media are also disclosed for managing an on-demand compute environment.

A benefit of the approaches disclosed herein is a reduction in unnecessary costs of building infrastructure to accommodate peak demand. Thus, customers only pay for the extra processing power they need only during those times when they need it.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended documents and drawings. Understanding that these drawings depict only typical embodiments of the invention and are not therefore to be considered to be limiting of its scope, the invention will be described and explained with additional specificity and detail through the use of the accompanying drawings.

FIG. 2 illustrates basic hardware components;

FIG. 3 illustrates a method aspect of the disclosure;

FIG. 4 illustrates a method aspect of the disclosure;

FIG. 6 illustrates another method aspect of the disclosure.

DETAILED DESCRIPTION OF THE INVENTION

Various embodiments are discussed in detail below. While specific implementations are discussed, it should be understood that this is done for illustration purposes only. A person skilled in the relevant art will recognize that other components and configurations may be used without parting from the spirit and scope of the invention.

This disclosure relates to the access and management of on-demand or utility computing resources at a hosting center.

Figure 1:
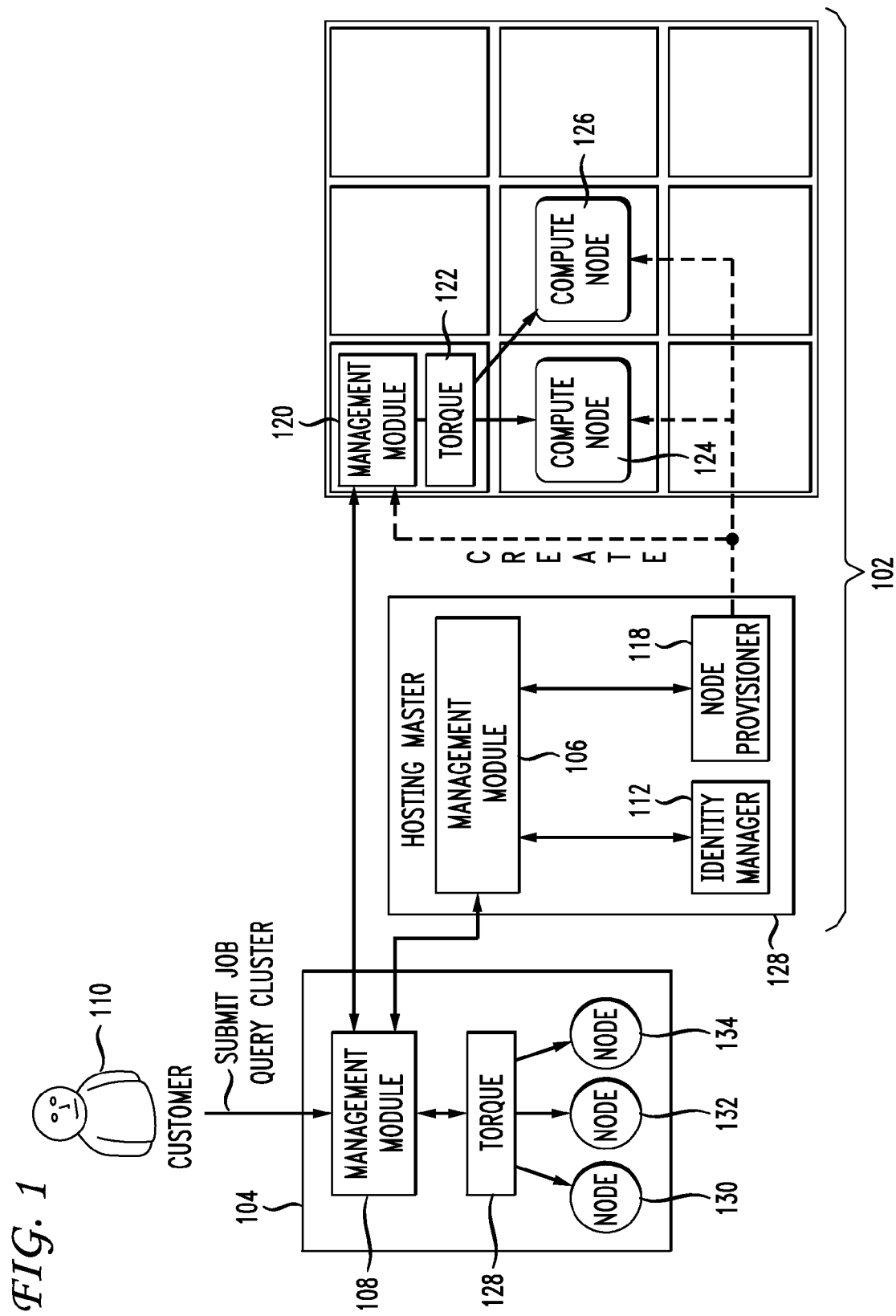
FIG. 1 illustrates the basic arrangement of the present disclosure.

FIG. 1 illustrates the basic arrangement and interaction between a local compute environment 104 and an on-demand hosting center 102. The local compute environment may comprise a cluster, a grid, or any other variation on these types of multiple node and commonly managed environments. The on-demand hosting center or on-demand computing environment 102 comprises a plurality of nodes that are available for provisioning and preferably has a dedicated node containing a hosting master 128 which may comprise a slave management module 106 and/or at least one other module such as the entity manager 128 and node provisioner 118.

Products such as Moab provide an essential service for optimization of a local compute environment. It provides an analysis into how & when local resources, such as software and hardware devices, are being used for the purposes of charge-back, planning,
auditing, troubleshooting and reporting internally or externally. Such optimization enables the local environment to be tuned to get the most out of the resources in the local compute environment. However, there are times where more resources are needed.

Typically a hosting center 102 will have the following attributes. It allows an organization to provide resources or services to customers where the resources or services are custom-tailored to the needs of the customer. Supporting true utility computing usually requires creating a hosting center 102 with one or more capabilities as follows: secure remote access, guaranteed resource availability at a fixed time or series of times, integrated auditing/accounting/billing services, tiered service level (QoS/SLA) based resource access, dynamic compute node provisioning, full environment management over compute, network, storage, and application/service based resources, intelligent workload optimization, high availability, failure recovery, and automated re-allocation.

A management module 108 such as, by way of example, Moab™ (which may also refer to any Moab product such as the Moab Workload Manager®, Moab Grid Monitor®, etc. from Cluster Resources, Inc.) enables utility computing by allowing compute resources to be reserved, allocated, and dynamically provisioned to meet the needs of internal or external workload. Thus, at peak workload times, the local compute environment does not need to be built out with peak usage in mind. As periodic peak resources are required, triggers can cause overflow to the on-demand environment and thus save money for the customer. The module 108 is able to respond to either manual or automatically generated requests and can guarantee resource availability subject to existing service level agreement (SLA) or quality of service (QOS) based arrangements. As an example, FIG. 1 shows a user submitting a job or a query 110 to the cluster or local environment 104. The local environment will typically be a cluster or a grid with local workload. Jobs may be submitted which have explicit resource requirements. The local environment 104 will have various attributes such as operating systems, architecture, network types, applications, software, bandwidth capabilities, etc, which are expected by the job implicitly. In other words, jobs will typically expect that the local environment will have certain attributes that will enable it to consume resources in an expected way.

Other software is shown by way of example in a distributed resource manager such as Torque 128 and various nodes 130, 132 and 134. The management modules (both master and/or slave) may interact and operate with any resource manager, such as Torque, LSF, SGE, PBS and LoadLeveler and are agnostic in this regard. Those of skill in the art will recognize these different distributed resource manager software packages.

A hosting master or hosting management module 106 may also be an instance of a Moab software product with hosting center capabilities to enable an organization to dynamically control network, compute, application, and storage resources and to dynamically provision operating systems, security, credentials, and other aspects of a complete end-to-end compute environments. Module 106 is responsible for knowing all the policies, guarantees, promises and also for managing the provisioning of resources within the utility computing space 102. In one sense, module 106 may be referred to as the "master" module in that it couples and needs to know all of the information associated with both the utility environment and the local environment. However, in another sense it may be referred to as the slave module or provisioning broker wherein it takes instructions from the customer management module 108 for provisioning resources and builds whatever environment is requested in the on-demand center 102. A slave module would have none of its own local policies but rather follows all requests from another management module. For example, when module 106 is the slave module, then a master module 108 would submit automated or manual (via an administrator) requests that the slave module 106 simply follows to manage the build out of the requested environment. Thus, for both IT and end users, a single easily usable interface can increase efficiency, reduce costs including management costs and improve investments in the local customer environment. The interface to the local environment which also has the access to the on-demand environment may be a web-interface or access portal as well. Restrictions of feasibility only may exist. The customer module 108 would have rights and ownership of all resources. The allocated resources would not be shared but be dedicated to the requestor. As the slave module 106 follows all directions from the master module 108, any policy restrictions will preferably occur on the master module 108 in the local environment.

The modules also provide data management services that simplify adding resources from across a local environment. For example, if the local environment comprises a wide area network, the management module 108 provides a security model that ensures, when the environment dictates, that administrators can rely on the system even when untrusted resources at the certain level have been added to the local environment or the on-demand environment. In addition, the management modules comply with n-tier web services based architectures and therefore scalability and reporting are inherent parts of the system. A system operating according to the principles set forth herein also has the ability to track, record and archive information about jobs or other processes that have been run on the system.

A hosting center 102 provides scheduled dedicated resources to customers for various purposes and typically has a number of key attributes: secure remote access, guaranteed resource availability at a fixed time or series of times, tightly integrated auditing/accounting services, varying quality of service levels providing privileged access to a set of users, node image management allowing the hosting center to restore an exact customer-specific image before enabling access. Resources available to a module 106, which may also be referred to as a provider resource broker, will have both rigid (architecture, RAM, local disk space, etc.) and flexible (OS, queues, installed applications etc.) attributes. The provider or on-demand resource broker 106 can typically provision (dynamically modify) flexible attributes but not rigid attributes. The provider broker 106 may possess multiple resources each with different types with rigid attributes (i.e., single processor and dual processor nodes, Intel nodes, AMD nodes, nodes with 512 MB RAM, nodes with 1 GB RAM, etc).

This combination of attributes presents unique constraints on a management system. We describe herein how the management modules 108 and 106 are able to effectively manage, modify and provision resources in this environment and provide full array of services on top of these resources.

Utility-based computing technology allows a hosting center 102 to quickly harness existing compute resources, dynamically co-allocate the resources, and automatically provision them into a seamless virtual cluster. The management modules' advanced reservation and policy management tools provide support for the establishment of extensive service level agreements, automated billing, and instant chart and report creation.

Also shown in FIG. 1 are several other components such as an identity manager 112 and a node provisioner 118 as part of the hosting center 102. The hosting master' 128 may include an identity manager interface 112 that may coordinate global and local information regarding users, groups, accounts, and classes associated with compute resources. The identity manager interface 112 may also allow the management module 106 to automatically and dynamically create and modify user accounts and credential attributes according to current workload needs. The hosting master 128 allows sites extensive flexibility when it comes to defining credential access, attributes, and relationships. In most cases, use of the USERCFG, GROUPCFG, ACCOUNTCFG, CLASSCFG, and QOSCFG parameters is adequate to specify the needed configuration. However, in certain cases, such as the following, this approach may not be ideal or even adequate: environments with very large user sets; environments with very dynamic credential configurations in terms of fairshare targets, priorities, service access constraints, and credential relationships; grid environments with external credential mapping information services; enterprise environments with fairness policies based on multi-cluster usage.

The modules address these and similar issues through the use of the identity manager 112. The identity manager 112 allows the module to exchange information with an external identity management service. As with the module's resource manager interfaces, this service can be a full commercial package designed for this purpose, or something far simpler by which the module obtains the needed information for a web service, text file, or database.

Next attention is turned to the node provisioner 118 and as an example of its operation, the node provisioner 118 can enable the allocation of resources in the hosting center 102 for workload from a local compute environment 104. The customer management module 108 will communicate with the hosting management module 106 to begin the provisioning process. In one aspect, the provisioning module 118 may generate another instance of necessary management software 120 and 122 which will be created in the hosting center environment as well as compute nodes 124 and 126 to be consumed by a submitted job. The new management module 120 is created on the fly, may be associated with a specific request and will preferably be operative on a dedicated node. If the new management module 120 is associated with a specific request or job, as the job consumes the resources associated with the provisioned compute nodes 124, 126, and the job becomes complete, then the system would remove the management module 120 since it was only created for the specific request. The new management module 120 may connect to other modules such as module 108. The module 120 does not necessarily have to be created but may be generated on the fly as necessary to assist in communication and provisioning and use of the resources in the utility environment 102. For example, the module 106 may go ahead and allocate nodes within the utility computing environment 102 and connect these nodes directly to module 108 but in that case you may lose some batch ability as a tradeoff. The hosting master 128 having the management module 106, identity manager 112 and node provisioner 118 preferably is co-located with the utility computing environment but may be distributed. The management module on the local environment 108 may then communicate directly with the created management module 120 in the hosting center to manage the transfer of workload and consumption of on-demand center resources.

FIG. 6 provides an illustration of a method aspect of utilizing the new management module. As shown, this method comprises receiving an instruction at a slave management module associated with an on-demand computing environment from a master management module associated with a local computing environment (602) and based on the instruction, creating a new management module on a node in the on-demand computing environment and provisioning at least one compute node in the on-demand computing environment, wherein the new management module manages the at least one compute node and communicates with the master management module (604).

There are two supported primary usage models, a manual and an automatic model. In manual mode, utilizing the hosted resources can be as easy as going to a web site, specifying what is needed, selecting one of the available options, and logging in when the virtual cluster is activated. In automatic mode, it is even simpler. To utilize hosted resources, the user simply submits jobs to the local cluster. When the local cluster can no longer provide an adequate level of service, it automatically contacts the utility hosting center, allocates additional nodes, and runs the jobs. The end user is never aware that the hosting center even exists. He merely notices that the cluster is now bigger and that his jobs are being run more quickly.

When a request for additional resources is made from the local environment, either automatically or manually, a client module or client resource broker (which may be, for example, an instance of a management module 108 or 120) will contact the provider resource broker 106 to request resources. It will send information regarding rigid attributes of needed resources as well as quantity or resources needed, request duration, and request timeframe (i.e., start time, feasible times of day, etc.) It will also send flexible attributes which must be provisioned on the nodes 124, 126. Both flexible and rigid resource attributes can come from explicit workload-specified requirement or from implicit requirements associated with the local or default compute resources. The provider resource broker 106 must indicate if it is possible to locate requested resources within the specified timeframe for sufficient duration and of the sufficient quantity. This task includes matching rigid resource attributes and identifying one or more provisioning steps required to put in place all flexible attributes.

When provider resources are identified and selected, the client resource broker 108 or 120 is responsible for seamlessly integrating these resources in with other local resources. This includes reporting resource quantity, state, configuration and load. This further includes automatically enabling a trusted connection to the allocated resources which can perform last mile customization, data staging, and job staging. Commands are provided to create this connection to the provider resource broker 106, query available resources, allocate new resources, expand existing allocations, reduce existing allocations, and release all allocated resources.

In most cases, the end goal of a hosting center 102 is to make available to a customer, a complete, secure, packaged environment which allows them to accomplish one or more specific tasks. This packaged environment may be called a virtual cluster and may consist of the compute, network, data, software, and other resources required by the customer. For successful operation, these resources must be brought together and provisioned or configured so as to provide a seamless environment which allows the customers to quickly and easily accomplish their desired tasks.

Another aspect of the invention is the cluster interface. The desired operational model for many environments is providing the customer with a fully automated self-service web interface. Once a customer has registered with the host company, access to a hosting center portal is enabled. Through this interface, customers describe their workload requirements, time constraints, and other key pieces of information. The interface communicates with the backend services to determine when, where, and how the needed virtual cluster can be created and reports back a number of options to the user. The user selects the desired option and can monitor the status of that virtual cluster via web and email updates. When the virtual cluster is ready, web and email notification is provided including access information. The customer logs in and begins working.

The hosting center 102 will have related policies and service level agreements. Enabling access in a first come-first served model provides real benefits but in many cases, customers require reliable resource access with guaranteed responsiveness. These requirements may be any performance, resource or time based rule such as in the following examples: I need my virtual cluster within 24 hours of asking; I want a virtual cluster available from 2 to 4 PM every Monday, Wednesday, and Friday; I want to always have a virtual cluster available and automatically grow/shrink it based on current load, etc.

Quality of service or service level agreement policies allow customers to convert the virtual cluster resources to a strategic part of their business operations greatly increasing the value of these resources. Behind the scenes, a hosting center 102 consists of resource managers, reservations, triggers, and policies. Once configured, administration of such a system involves addressing reported resource failures (i.e., disk failures, network outages, etc) and monitoring delivered performance to determine if customer satisfaction requires tuning policies or adding resources.

The modules associated with the local environment 104 and the hosting center environment 102 may be referred to as a master module 108 and a slave module 106. This terminology relates to the functionality wherein the hosting center 102 receives requests for workload and provisioning of resources from the module 108 and essentially follows those requests. In this regard, the module 108 may be referred to as a client resource broker 108 which will contact a provider resource broker 106 (such as an On-Demand version of Moab).

The management module 108 may also be, by way of example, a Moab Workload Manager® operating in a master mode. The management module 108 communicates with the compute environment to identify resources, reserve resources for consumption by jobs, provision resources and in general manage the utilization of all compute resources within a compute environment. As can be appreciated by one of skill in the art, these modules may be programmed in any programming language, such as C or C++ and which language is immaterial to the invention.

In a typical operation, a user or a group submits a job to a local compute environment 104 via an interface to the management module 108. An example of a job is a submission of a computer program that will perform a weather analysis for a television station that requires the consumption of a large amount of compute resources. The module 108 and/or an optional scheduler 128 such as TORQUE, as those of skill in the art understand, manages the reservation of resources and the consumption of resources within the environment 104 in an efficient manner that complies with policies and restrictions. The use of a resource manager like TORQUE 128 is optional and not specifically required as part of the disclosure.

A user or a group of users will typically enter into a service level agreement (SLA) which will define the policies and guarantees for resources on the local environment 104. For example, the SLA may provide that the user is guaranteed 10 processors and 50 GB of hard drive space within 5 hours of a submission of a job request. Associated with any user may be many parameters related to permissions, guarantees, priority level, time frames, expansion factors, and so forth. The expansion factor is a measure of how long the job is taking to run on a local environment while sharing the environment with other jobs versus how long it would take if the cluster was dedicated to the job only. It therefore relates to the impact of other jobs on the performance of the particular job. Once a job is submitted and will sit in a job queue waiting to be inserted into the cluster 104 to consume those resources. The management software will continuously analyze the environment 104 and make reservations of resources to seek to optimize the consumption of resources within the environment 104. The optimization process must take into account all the SLA's of users, other policies of the environment 104 and other factors.

As introduced above, this disclosure provides improvements in the connectivity between a local environment 104 and an on-demand center 102. The challenges that exist in accomplishing such a connection include managing all of the capabilities of the various environments, their various policies, current workload, workload queued up in the job queues and so forth.

As a general statement, disclosed herein is a method and system for customizing an on-demand compute environment based on both implicit and explicit job or request requirements. For example, explicit requirements may be requirements specified with a job such as a specific number of nodes or processor and a specific amount of memory. Many other attributes or requirements may be explicitly set forth with a job submission such as requirements set forth in an SLA for that user. Implicit requirements may relate to attributes of the compute environment that the job is expecting because of where it is submitted. For example, the local compute environment 104 may have particular attributes, such as, for example, a certain bandwidth for transmission, memory, software licenses, processors and processor speeds, hard drive memory space, and so forth. Any parameter that may be an attribute of the local environment in which the job is submitted may relate to an implicit requirement. As a local environment 104 communicates with an on-demand environment 102 for the transfer of workload, the implicit and explicit requirements are seamlessly imported into the on-demand environment 102 such that the user's job can efficiently consume resources in the on-demand environment 102 because of the customization of that environment for the job. This seamless communication occurs between a master module 108 and a slave module 106 in the respective environments. As shown in FIG. 1, a new management module 120 may also be created for a specific process or job and also communicate with a master module 108 to manage the provisioning, consumption and clean up of compute nodes 124, 126 in the on-demand environment 102.

Part of the seamless communication process includes the analysis and provisioning of resources taking into account the need to identify resources such as hard drive space and bandwidth capabilities to actually perform the transfer of the workload. For example, if it is determined that a job in the queue has a SLA that guarantees resources within 5 hours of the request, and based on the analysis by the management module of the local environment the resources cannot be available for 8 hours, and if such a scenario is at triggering event, then the automatic and seamless connectivity with the on-demand center 102 will include an analysis of how long it will take to provision an environment in the on-demand center that matches or is appropriate for the job to run. That process, of provisioning the environment in the on-demand center 102, and transferring workload from the local environment 104 to the on-demand center 102, may take, for example, 1 hour. In that case, the on-demand center will begin the provisioning process one hour before the 5 hour required time such that the provisioning of the environment and transfer of data can occur to meet the SLA for that user. This provisioning process may involve reserving resources within the on-demand center 102 from the master module 108 as will be discussed more below.

FIG. 3 illustrates an embodiment in this regard, wherein a method comprises detecting an event in a local compute environment (302). The event may be a resource need event such as a current resource need or a predicted resource need. Based on the detected event, a module automatically establishes communication with an on-demand compute environment (304). This may also involve dynamically negotiating and establishing a grid/peer relationship based on the resource need event. A module provisions resources within the on-demand compute environment (306) and workload is transferred from the local-environment transparently to the on-demand compute environment (308). Preferably, local information is imported to the on-demand environment and on-demand information is communicated to the local compute environment, although only local environment information may be needed to be transmitted to the on-demand environment. Typically, at least local environment information is communicated and also job information may be communicated to the on-demand environment. Examples of local environment information may be at least one of class information, configuration policy information and other information. Information from the on-demand center may relate to at least one of resources, availability of resources, time frames associated with resources and any other kind of data that informs the local environment of the opportunity and availability of the on-demand resources. The communication and management of the data between the master module or client module in the local environment and the slave module is preferably transparent and unknown to the user who submitted the workload to the local environment. However, one aspect may provide for notice to the user of the tapping into the on-demand resources and the progress and availability of those resources.

Example triggering events may be related to at least one of a resource threshold, a service threshold, workload and a policy threshold or other factors. Furthermore, the event may be based one of all workload associated with the local compute environment or a subset of workload associated with the compute environment or any other subset of a given parameter or may be external to the compute environment such as a natural disaster or power outage or predicted event.

The disclosure below provides for various aspects of this connectivity process between a local environment 104 and an on-demand center 102. The CD submitted with the priority Provisional patent application includes source code that carries out this functionality. The various aspects will include an automatic triggering approach to transfer workload from the local environment 104 to the on-demand center 102, a manual "one-click" method of integrating the on-demand compute environment 102 with the local environment 104 and a concept related to reserving resources in the on-demand compute environment 102 from the local compute environment 104.

The first aspect relates to enabling the automatic detection of a triggering event such as passing a resource threshold or service threshold within the compute environment 104. This process may be dynamic and involve identifying resources in a hosting center, allocating resources and releasing them after consumption. These processes may be automated based on a number of factors, such as: workload and credential performance thresholds; a job's current time waiting in the queue for execution, (queuetime) (i.e., allocate if a job has waited more than 20 minutes to receive resources); a job's current expansion factor which relates to a comparison of the affect of other jobs consuming local resources has on the particular job in comparison to a value if the job was the only job consuming resources in the local environment; a job's current execution load (i.e., allocate if load on job's allocated resources exceeds 0.9); quantity of backlog workload (i.e., allocate if more than 50,000 proc-hours of workload exist); a job's average response time in handling transactions (i.e., allocate if job reports it is taking more than 0.5 seconds to process transaction); a number of failures workload has experienced (i.e., allocate if a job cannot start after 10 attempts); overall system utilization (i.e., allocate if more than 80% of machine is utilized) and so forth. This is an example list and those of skill in the art will recognize other factors that may be identified as triggering events.

Other triggering events or thresholds may comprise a predicted workload performance threshold. This would relate to the same listing of events above but be applied in the context of predictions made by a management module or customer resource broker.

Another listing of example events that may trigger communication with the hosting center include, but are not limited to events such as resource failures including compute nodes, network, storage, license (i.e., including expired licenses); service failures including DNS, information services, web services, database services, security services; external event detected (i.e., power outage or national emergency reported) and so forth. These triggering events or thresholds may be applied to allocate initial resources, expand allocated resources, reduce allocated resources and release all allocated resources. Thus, while the primary discussion herein relates to an initial allocation of resources, these triggering events may cause any number of resource-related actions. Events and thresholds may also be associated with any subset of jobs or nodes (i.e., allocate only if threshold backlog is exceeded on high priority jobs only or jobs from a certain user or project or allocate resources only if certain service nodes fail or certain licenses become unavailable.)

For example, if a threshold of 95% of processor consumption is met by 951 processors out of the 1000 processors in the environment are being utilized, then the system (which may or may not include the management module 108) automatically establishes a connection with the on-demand environment 102. Another type of threshold may also trigger the automatic connection such as a service level received threshold, a service level predicted threshold, a policy-based threshold, a threshold or event associated with environment changes such as a resource failure (compute node, network storage device, or service failures).

In a service level threshold, one example is where a SLA specifies a certain service level requirement for a customer, such as resources available within 5 hours. If an actual threshold is not met, i.e., a job has waited now for 5 hours without being able to consume resource, or where a threshold is predicted to not be met, these can be triggering events for communication with the on-demand center. The module 108 then communicates with the slave manager 106 to provision or customize the on-demand resources 102. The two environments exchange the necessary information to create reservations of resources, provision, handle licensing, and so forth, necessary to enable the automatic transfer of jobs or other workload from the local environment 104 to the on-demand environment 102. For a particular task or job, all or part of the workload may be transferred to the on-demand center. Nothing about a user job 110 submitted to a management module 108 changes. The on-demand environment 102 then instantly begins running the job without any change in the job or perhaps even any knowledge of the submitter.

There are several aspects of the disclosure that are shown in the source code on the CD. One is the ability to exchange information. For example, for the automatic transfer of workload to the on-demand center, the system will import remote classes, configuration policy information and other information from the local scheduler 108 to the slave scheduler 106 for use by the on-demand environment 102. Information regarding the on-demand compute environment, resources, policies and so forth are also communicated from the slave module 106 to the local module 108.

The triggering event for the automatic establishment of communication with the on-demand center and a transfer of workload to the on-demand center may be a threshold that has been passed or an event that occurred. Threshold values may comprise an achieved service level, predicted service level and so forth. For example, a job sitting in a queue for a certain amount of time may trigger a process to contact the on-demand center and transfer that job to the on-demand center to run. If a queue has a certain number of jobs that have not been submitted to the compute environment for processing, if a job has an expansion factor that has a certain value, if a job has failed to start on a local cluster one or more times for whatever reason, then these types of events may trigger communication with the on-demand center. These have been examples of threshold values that when passed will trigger communication with the on-demand environment.

Example events that also may trigger the communication with the on-demand environment include, but are not limited to, events such as the failure of nodes within the environment, storage failure, service failure, license expiration, management software failure, resource manager fails, etc. In other words, any event that may be related to any resource or the management of any resource in the compute environment may be a qualifying event that may trigger workload transfer to an on-demand center. In the license expiration context, if the license in a local environment of a certain software package is going to expire such that a job cannot properly consume resources and utilize the software package, the master module 108 can communicate with the slave module 106 to determine if the on-demand center has the requisite license for that software. If so, then the provisioning of the resources in the on-demand center can be negotiated and the workload transferred wherein it can consume resources under an appropriate legal and licensed framework.

The basis for the threshold or the event that triggers the communication, provisioning and transfer of workload to the on-demand center may be all jobs/workload associated with the local compute environment or a subset of jobs/workload associated with the local compute environment. In other words, the analysis of when an event and/or threshold should trigger the transfer of workload may be based on a subset of jobs. For example, the analysis may be based on all jobs submitted from a particular person or group or may be based on a certain type of job, such as the subset of jobs that will require more than 5 hours of processing time to run. Any parameter may be defined for the subset of jobs used to base the triggering event.

The interaction and communication between the local compute environment and the on-demand compute environment enables an improved process for dynamically growing and shirking provisioned resource space based on load. This load balancing between the on-demand center and the local environment may be based on thresholds, events, all workload associated with the local environment or a subset of the local environment workload.

Another aspect of the disclosure is the ability to automate data management between two sites. This involves the transparent handling of data management between the on-demand environment 102 and the local environment 104 that is transparent to the user. Typically environmental information will always be communicated between the local environment 104 and the on-demand environment 102. In some cases, job information may not need to be communicated because a job may be gathering its own information, say from the Internet, or for other reasons. Therefore, in preparing to provision resources in the on-demand environment all information or a subset of information is communicated to enable the process. Yet another aspect of the invention relates to a simple and easy mechanism to enable on-demand center integration. This aspect of the invention involves the ability of the user or an administrator to, in a single action like the click of a button or a one-click action, be able to command the integration of an on-demand center information and capability into the local resource manager 108.

This feature is illustrated in FIG. 4. A module, preferably associated with the local compute environment, receives a request from an administrator to integrate an on-demand compute environment into the local compute environment (402). The creation of a reservation or of a provisioning of resources in the on-demand environment may be from a request from an administrator or local or remote automated broker. In this regard, the various modules will automatically integrate local compute environment information with on-demand compute environment information to make available resources from the on-demand compute environment to requestors of resources in the local compute environment (404). Integration of the on-demand compute environment may provide for integrating: resource configuration, state information, resource utilization reporting, job submission information, job management information resource management, policy controls including priority, resource ownership, queue configuration, job accounting and tracking and resource accounting and tracking. Thus, the detailed analysis and tracking of jobs and resources may be communicated back from the on-demand center to the local compute environment interface. Furthermore, this integration process may also include a step of automatically creating at least one of a data migration interface and a job migration interface.

Another aspect provides for a method of integrating an on-demand compute environment into a local compute environment. The method comprises receiving a request from an administrator or via an automated command from an event trigger or administrator action to integrate an on-demand compute environment into a local compute environment. In response to the request, local workload information and/or resource configuration information is routed to an on-demand center and an environment is created and customized in the on-demand center that is compatible with workload requirements submitted to the local compute environment. Billing and costing are also automatically integrated and handled.

The exchange and integration of all the necessary information and resource knowledge may be performed in a single action or click to broaden the set of resources that may be available to users who have access initially only to the local compute environment 104. The system may receive the request to integrate an on-demand compute environment into a local compute environment in other manners as well, such as any type of multi-modal request, voice request, graffiti on a touch-sensitive screen request, motion detection, and so forth. Thus the one-click action may be a single tap on a touch sensitive display or a single voice command such as "integrate" or another command or multi-modal input that is simple and singular in nature. In response to the request, the system automatically integrates the local compute environment information with the on-demand compute environment information to enable resources from the on-demand compute environment available to requestors of resources in the local compute environment.

The one-click approach relates to the automated approach expect a human is in the middle of the process. For example, if a threshold or a triggering event is passed, an email or a notice may be sent to an administrator with options to allocate resources from the on-demand center. The administrator may be presented with one or more options related to different types of allocations that are available in the on-demand center—and via one-click or one action the administrator may select the appropriate action. For example, three options may include 500 processors in 1 hour; 700 processors in 2 hours; and 1000 processors in 10 hours. The options may be intelligent in that they may take into account the particular triggering event, costs of utilizing the on-demand environment, SLAs, policies, and any other parameters to present options that comply with policies and available resources. The administrator may be given a recommended selection based on SLAs, cost, or any other parameters discussed herein but may then choose the particular allocation package for the on-demand center. The administrator also may have an option, without an alert, to view possible allocation packages in the on-demand center if the administrator knows of an upcoming event that is not capable of being detected by the modules, such as a meeting with a group wherein they decide to submit a large job the next day which will clearly require on-demand resources. The one-click approach encapsulates the command line instruction to proceed with the allocation of on-demand resources.

One of the aspects of the disclosure is the integration of an on-demand environment 102 and a local compute environment 104 is that the overall data appears locally. In other words, the local scheduler 108 will have access to the resources and knowledge of the on-demand environment 102 but those resources, with the appropriate adherence to local policy requirements, is handled locally and appears locally to users and administrators of the local environment 104.

Another aspect of the invention that is enabled with the attached source code is the ability to specify configuration information and feeding it down the line. For example, the interaction between the compute environments supports static reservations. A static reservation is a reservation that a user or an administrator cannot change, remove or destroy. It is a reservation that is associated with the resource manager 108 itself. A static reservation blocks out time frames when resources are not available for other uses. For example, if to enable a compute environment to have workload run on (or consume) resources, a job takes an hour to provision a resources, then the module 108 may make a static reservation of resources for the provisioning process. The module 108 will locally create a static reservation for the provisioning component of running the job. The module 108 will report on these constraints associated with the created static reservation within the on-demand compute environment.

Then, the module 108 will communicate with the slave module 106 if on-demand resources are needed to run a job. The module 108 communicates with the slave module 106 and identifies what resources are needed (20 processors and 512 MB of memory, for example) and inquires when can those resources be available. Assume that module 106 responds that the processors and memory will be available in one hour and that the module 108 can have those resources for 36 hours. Once all the appropriate information has been communicated between the modules 106 and 108, then module 108 creates a static reservation to block the first part of the resources which requires the one hour of provisioning. The module 108 may also block out the resources with a static reservation from hour 36 to infinity until the resources go away. Therefore, from zero to one hour is blocked out by a static reservation and from the end of the 36 hours to infinity is blocked out. In this way, the scheduler 108 can optimize the on-demand resources and insure that they are available for local workloads. The communication between the modules 106 and 108 is performed preferably via tunneling.

Another aspect relates to receiving requests or information associated with resources in an on-demand center. An example will illustrate. Assume that a company has a reservation of resources within an on-demand center but then finds out that their budget is cut for the year. There is a mechanism for an administrator to enter information such as a request for a cancellation of a reservation so that they do not have to pay for the consumption of those resources. Any type of modification of the on-demand resources may be contemplated here. This process involves translating a current or future state of the environment for a requirement of the modification of usable resources. Another example includes where a group determines that they will run a large job over the weekend that will knowingly need more than the local environment. An administrator can submit in the local resource broker 108 a submission of information associated with a parameter—such as a request for resources and the local broker 108 will communicate with the hosting center 106 and the necessary resources can be reserved in the on-demand center even before the job is submitted to the local environment.

The modification of resources within the on-demand center may be an increase, decrease, or cancellation of resources or reservations for resources. The parameters may be a direct request for resources or a modification of resources or may be a change in an SLA which then may trigger other modifications. For example, if an SLA prevented a user from obtaining more than 500 nodes in an on-demand center and a current reservation has maximized this request, a change in the SLA agreement that extended this parameter may automatically cause the module 106 to increase the reservation of nodes according to the modified SLA. Changing policies in this manner may or may not affect the resources in the on-demand center.

Figure 5:
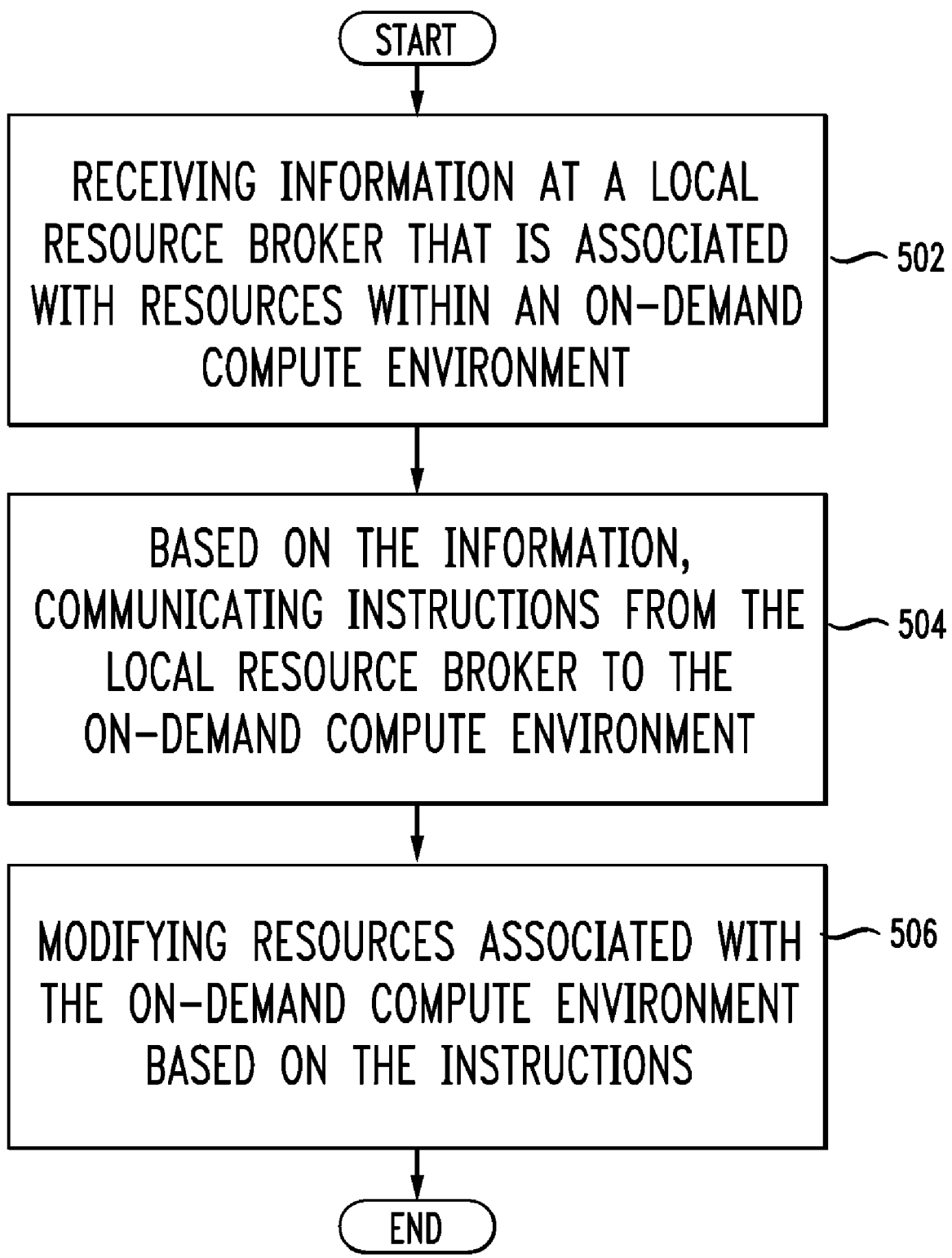
FIG. 5 illustrates another method aspect of the disclosure.

FIG. 5 illustrates a method embodiment related to modifying resources in the on-demand compute environment. The method comprises receiving information at a local resource broker that is associated with resources within an on-demand compute environment (502). Based on the information, the method comprises communicating instructions from the local resource broker to the on-demand compute environment (504) and modifying resources associated with the on-demand compute environment based on the instructions (506). As mentioned above, examples of the type of information that may be received include information associated with a request for a new reservation, a cancellation of an existing reservation, or a modification of a reservation such as expanding or contracting the reserved resources in the on-demand compute environment. Other examples include a revised policy or revision to an SLA that alters (increases or perhaps decreases) allowed resources that may be reserved in the on-demand center. The master module 108 will then provide instructions to the slave module 106 to create or modify reservations in the on-demand computing environment or to make some other alteration to the resources as instructed.

Receiving resource requirement information may be based on user specification, current or predicted workload. The specification of resources may be fully explicit, or may be partially or fully implicit based on workload or based on virtual private cluster (VPC) package concept where VPC package can include aspects of allocated or provisioning support environment and adjustments to resource request timeframes including pre-allocation, allocation duration, and post-allocation timeframe adjustments. The Application incorporated above provides information associated with the VPC that may be utilized in many respects in this invention. The reserved resources may be associated with provisioning or customizing the delivered compute environment. A reservation may involve the co-allocation of resources including any combination of compute, network, storage, license, or service resources (i.e., parallel database services, security services, provisioning services) as part of a reservation across multiple different resource types. Also, the co-allocation of resources over disjoint timeframes to improve availability and utilization of resources may be part of a reservation or a modification of resources. Resources may also be reserved with automated failure handling and resource recovery.

Another feature associated with reservations of resources within the on-demand environment is the use of provisioning padding. This is an alternate approach to the static reservation discussed above. For example, if a reservation of resources would require 2 hours of processing time for 5 nodes, then that reservation may be created in the on-demand center as directed by the client resource broker 108. As part of that same reservation or as part of a separate process, the reservation may be modified or adjusted to increase its duration to accommodate for provisioning overhead and clean up processes. Therefore, there may need to be ½ hour of time in advance of the beginning of the two hour block wherein data transmission, operating system set up, or any other provisioning step needs to occur. Similarly, at the end of the two hours, there may need to be 15 minutes to clean up the nodes and transmit processed data to storage or back to the local compute environment. Thus, an adjustment of the reservation may occur to account for this provisioning in the on-demand environment. This may or may not occur automatically, for example, the user may request resources for 2 hours and the system may automatically analyze the job submitted or utilize other information to automatically adjust the reservation for the provisioning needs. The administrator may also understand the provisioning needs and specifically request a reservation with provisioning pads on one or both ends of the reservation.

A job may also be broken into component parts and only one aspect of the job transferred to an on-demand center for processing. In that case, the modules will work together to enable co-allocation of resources across local resources and on-demand resources. For example, memory and processors may be allocated in the local environment while disk space is allocated in the on-demand center. In this regard, the local management module could request the particular resources needed for the co-allocation from the on-demand center and when the job is submitted for processing that portion of the job would consume on-demand center resources while the remaining portion of the job consumes local resources. This also may be a manual or automated process to handle the co-allocation of resources.

Another aspect relates to interaction between the master management module 106 and the slave management module 106. Assume a scenario where the local compute environment requests immediate resources from the on-demand center. Via the communication between the local and the on-demand environments, the on-demand environment notifies the local environment that resources are not available for eight hours but provides the information about those resources in the eight hours. At the local environment, the management module 108 may instruct the on-demand management module 106 to establish a reservation for those resources as soon as possible (in eight hours) including, perhaps, provisioning padding for overhead. Thus, although the local environment requested immediate resources from the on-demand center, the best that could be done in this case is a reservation of resources in eight hours given the provisioning needs and other workload and jobs running on the on-demand center. Thus, jobs running or in the queue at the local environment will have an opportunity to tap into the reservation and given a variety of parameters, say job number 12 has priority or an opportunity to get a first choice of those reserved resources.

With reference to FIG. 2, an exemplary system for implementing the invention includes a general purpose computing device 200, including a processing unit (CPU) 220, a system memory 230, and a system bus 210 that couples various system components including the system memory 230 to the processing unit 220. The system bus 210 may be any of several types of bus structures including a memory bus or memory controller, a peripheral bus, and a local bus using any of a variety of bus architectures. The system may also include other memory such as read only memory (ROM) 240 and random access memory (RAM) 250. A basic input/output (BIOS), containing the basic routine that helps to transfer information between elements within the computing device 200, such as during start-up, is typically stored in ROM 240. The computing device 200 further includes storage means such as a hard disk drive 260, a magnetic disk drive, an optical disk drive, tape drive or the like. The storage device 260 is connected to the system bus 210 by a drive interface. The drives and the associated computer-readable media provide nonvolatile storage of computer readable instructions, data structures, program modules and other data for the computing device 200. In this regard, the various functions associated with the invention that are primarily set forth as the method embodiment of the invention may be practiced by using any programming language and programming modules to perform the associated operation within the system or the compute environment. Here the compute environment may be a cluster, grid, or any other type of coordinated commodity resources and may also refer to two separate compute environments that are coordinating workload, workflow and so forth such as a local compute environment and an on-demand compute environment. Any such programming module will preferably be associated with a resource management or workload manager or other compute environment management software such as Moab but may also be separately programmed. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that is accessible by a computer, such as magnetic cassettes, flash memory cards, digital video disks, memory cartridges, random access memories (RAMs) read only memory (ROM), and the like, may also be used in the exemplary operating environment. The system above provides an example server or computing device that may be utilized and networked with a cluster, clusters or a grid to manage the resources according to the principles set forth herein. It is also recognized that other hardware configurations may be developed in the future upon which the method may be operable.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. As can also be appreciated, the compute environment itself, being managed according to the principles of the invention, may be an embodiment of the invention. Thus, separate embodiments may include an on-demand compute environment, a local compute environment, both of these environments together as a more general compute environment, and so forth. In a distributed computing environment, program modules may be located in both local and remote memory storage devices. Accordingly, the scope of the claims should be governed by the claims and their equivalents below rather than by any particular example in the specification.

I claim:

1. An on-demand compute environment comprising:
a processor; and
a computer-readable storage medium having stored therein instructions which, when executed by the processor, cause the processor to perform a method comprising:
receiving instructions from a master management module in an external compute environment separate from the on-demand compute environment to yield received instructions, the external compute environment configured to receive workload for processing on external compute nodes from users via reservation of the external compute nodes, and the on-demand compute environment having on-demand compute nodes available for provisioning and processing workload via reservation of the on-demand compute nodes under a slave management module, and wherein the on-demand compute environment is not a video on-demand server;
creating a new management module on one of the on-demand compute nodes based on the received instructions, wherein the new management module provisions at least one other compute node to be managed by the new management module to yield a provisioned at last one other compute node; and
receiving workload for processing from the external compute environment and causing the workload to consume the provisioned at least one other compute node, wherein the new management module operates in addition to the slave management module only for a duration of the workload that consumes the provisioned at least one other compute node.

2. The on-demand compute environment of claim 1, wherein the at least one other compute node is provisioned according to an analysis of at least part of the workload.

3. The on-demand compute environment of claim 1, wherein provisioning of the at least one other compute node further comprises modifying an existing reservation associated with the at least one compute node.

4. The on-demand compute environment of claim 1, wherein the new management module communicates with the master management module in the external compute environment.

5. The on-demand compute environment of claim 1, wherein provisioning the at least one other compute node further comprises provisioning a resource manager with the new management module to manage the provisioned at least one other compute node.

6. A method of managing an on-demand compute environment, the method comprising:
- receiving instructions at a slave management module from a master management module associated with an external computing environment separate from the on-demand compute environment to yield received instructions, the external compute environment configured to receive workload for processing on external compute nodes in the external compute environment from users via registration of the external compute nodes, the on-demand compute environment having on-demand compute nodes available for provisioning and processing workload via the slave management module via reserving the on-demand compute nodes, and wherein the on-demand compute environment is not a video on-demand server;
- creating, via a processor, a new management module, based on the received instructions, on a compute node in the on-demand computing environment;
- provisioning via the new management module the on-demand compute nodes in the on-demand compute environment to yield provisioned on-demand compute nodes; and
- receiving workload for processing from the external compute environment, wherein the new management module operates in addition to the slave management module only for a duration of the workload consuming the provisioned on-demand compute nodes.

7. The method of claim 6, wherein the on-demand compute nodes are provisioned an analysis of at least part of the workload.

8. The method of claim 6, further comprising removing the new management module after the workload consumes the provisioned on-demand compute nodes.

9. The method of claim 6, wherein the new management module communicates with the master management module.

10. A non-transitory computer-readable storage medium having stored therein instructions which, when executed by a processor within an on-demand compute environment having on-demand compute nodes available for provisioning and for processing workload, cause the processor to perform a method comprising:
- receiving instructions from a master management module in an external compute environment separate from the on-demand compute environment to yield received instructions, the external compute environment configured to receive workload for processing on external compute nodes in the external compute environment from users via registration of the external compute nodes, the on-demand compute environment having on-demand compute nodes available for provisioning and processing workload via the slave management module via reserving the on-demand compute nodes, and wherein the on-demand compute environment is not a video on-demand server;
- creating a new management module on at least one of the on-demand compute nodes based on the received instructions such that at least one other compute node is provisioned to be managed by the new management module to yield a provisioned at least one other compute node; and
- receiving workload for processing from the external compute environment that consumes the provisioned on-demand compute node, wherein the new management module operates in addition to the slave management module only while the workload consumes the provisioned on-demand compute node.

11. The non-transitory computer-readable storage medium of claim 10, wherein the on-demand compute node is provisioned according to an analysis of at least part of the workload.

12. The non-transitory computer-readable storage medium of claim 10, wherein provisioning of the on-demand other compute node further comprises modifying an existing reservation associated with the one on-demand compute node.

13. The non-transitory computer-readable storage medium of claim 10, wherein the new management module communicates with the master management module in the external compute environment.

14. The non-transitory computer-readable storage medium of claim 10, wherein provisioning the at least one other compute node further comprises provisioning a resource manager with the new management module to manage the provisioned on-demand compute node.

15. A method of managing access to a separately administered on-demand compute environment using a computing device in an external compute environment having a master management module that manages compute resources in the external compute environment, the method comprising:
- receiving workload identifying via a processor a triggering event in the external compute environment, the external compute environment configured to receive workload for processing from users via reserving external compute nodes in the external compute environment;
- communicating via the master management module with a slave management module in the on-demand compute environment, wherein the on-demand compute environment is not a video on-demand server;
- transmitting instructions to the slave management module that cause the slave management module to establish a new management module which provisions on-demand compute nodes in the on-demand compute environment to be managed by the new management module to yield provisioned on-demand compute nodes; and
- communicating at least part of the workload to the on-demand compute environment, wherein the at least part of the workload consumes resources of the provisioned on-demand compute nodes.
- wherein the new management module operates in addition to the slave management module only for a duration of the at least part of the workload that consumes the provisioned on-demand compute nodes.

16. The method of claim 15, wherein the new management module reserves, allocates, and dynamically provisions compute resources associated with the workload in the on-demand compute environment.

17. The method of claim 15, further comprising transmitting to the on-demand compute environment second instructions for unprovisioning the provisioned on-demand compute nodes.

18. The method of claim 17, wherein after all the provisioned on-demand compute nodes are unprovisioned, the new management module is removed from the on-demand compute environment.

19. The method of claim 15, further comprising dynamically determining when to unprovision the provisioned on-demand compute nodes.

20. The method of claim 15, further comprising:
- receiving updated instructions based on an update event associated with the workload for provisioning additional compute nodes in the on-demand compute environment to yield additional provisioned compute nodes; and
- communicating part of the workload associated with the update event to at least one of the provisioned compute nodes and the additional provisioned compute nodes in the on-demand compute environment.

21. The method of claim 15, further comprising transmitting configuration instructions to the new management module for configuring the provisioned on-demand compute nodes in the on-demand compute environment.

22. The method of claim 15, wherein the new management module is removed when the workload finishes consuming resources.

23. A method of managing an on-demand compute environment, the method comprising:
receiving a communication from a separately administered external computer compute environment, the external compute environment configured to receive workload for processing from users via a reservation of external compute nodes in the external compute environment;
establishing via a processor a slave node in the on-demand compute environment, wherein the on-demand compute environment is not a video on-demand server;
receiving instructions that cause the slave node to provision on-demand compute nodes in the on-demand compute environment to yield provisioned on-demand compute nodes;
receiving transferred workload from the external compute environment to yield received workload;
communicating the received workload to the provisioned on-demand compute nodes in the on-demand compute environment, wherein the received workload consumes resources of the provisioned on-demand compute nodes; and
de-establishing the slave node after the received workload consumes the resources of the provisioned on-demand compute nodes.

24. The method of claim 23, wherein the slave node is configured to reserve, allocate, and dynamically provision compute resources in the on-demand compute environment.

25. The method of claim 23, further comprising de-establishing the slave node after all provisioned on-demand compute nodes are unprovisioned.

26. The method of claim 23, further comprising:
receiving updated instructions based on an update event associated with the received workload for provisioning additional compute nodes in the on-demand compute environment to yield additional provisioned compute nodes; and
receiving second workload associated with the update event to at least one of the provisioned compute nodes and the additional provisioned compute nodes in the on-demand compute environment.

27. The method of claim 23, further comprising receiving configuration instructions for configuring the provisioned on-demand compute nodes.

28. A management node in an on-demand compute environment that manages a plurality of compute nodes in the on-demand compute environment, the management node comprising:
a processor; and
a computer-readable storage medium having stored therein instructions which, when executed by the processor, cause the processor to perform a method comprising:
receiving via the management node a communication from a master node in a separately administered external compute environment, the external compute environment configured to receive workload for processing from users via a reservation of external compute nodes in the external compute environment;
establishing a slave node and provisioning compute nodes in the on-demand compute environment based on the communication to yield provisioned on-demand compute nodes, wherein the on-demand compute environment is not a video on-demand server;
receiving transferred workload submitted into the external compute environment to yield received workload;
communicating the received workload to the provisioned on-demand compute nodes, wherein the received workload consumes resources of the provisioned on-demand compute nodes; and
de-establishing the slave node after the received workload finishes consuming the resources of the provisioned on-demand compute nodes.

29. The management node of claim 28, wherein the computer-readable storage medium further stores instructions which result in the method further comprising configuring the slave node to reserve, allocate, and dynamically provision resources of the plurality of compute nodes in the on-demand compute environment.

30. The management node of claim 28, wherein the slave node is de-established after the provisioned on-demand compute nodes are released.

31. The management node of claim 28, wherein the computer-readable storage medium further stores instructions which result in the method further comprising:
receiving an update event associated with the workload;
receiving update instructions based on the update event from the master node for provisioning additional compute nodes of the plurality of compute nodes to yield additional provisioned compute nodes; and
receiving update workload associated with the update event from the external compute environment to at least one of the provisioned on-demand compute nodes and the additional provisioned on-demand compute nodes of the plurality of compute nodes.

32. The management node of claim 28, wherein the computer-readable storage medium further stores instructions which result in the method further comprising:
receiving configurations and instructions from the master node to the slave node for configuring the provisioned on-demand computed nodes to match workload policies associated with the external compute environment.

33. A non-transitory computer-readable storage medium having stored therein instructions which, when executed by a processor in an on-demand compute environment, cause the processor to perform a method comprising:
receiving a communication from a separately administered external compute environment, the external compute environment configured to receive workload for processing from users via a reservation of external compute nodes in the external compute environment;
establishing a slave node in the on-demand compute environment based on the communication, wherein the on-demand compute environment is not a video on-demand server;
receiving instructions which cause the slave node to provision compute nodes in the on-demand compute environment to yield provisioned on-demand compute nodes;
receiving workload submitted into the external compute environment and transferred to the on-demand compute environment to yield received workload;
communicating the received workload to the provisioned on-demand compute nodes, wherein the received workload consumes resources of the provisioned compute nodes; and de-establishing the slave node after the received workload consumes the resources.

34. A method of managing an on-demand compute environment, the method comprising:

based on a communication from an external compute environment at a first management module in a separately administered on-demand compute environment, provisioning a second management module on a node in the on-demand compute environment, the external compute environment configured to receive workload for processing from users via a reservation of external compute nodes in the external compute environment, wherein the on-demand compute environment is not a video on-demand server;

provisioning compute nodes in the on-demand compute environment for workload to be managed by the second management module to yield provisioned on-demand compute nodes;

communicating to the provisioned on-demand compute nodes received workload that was previously submitted into the external compute environment, wherein the received workload consumes resources of the provisioned on-demand compute nodes as managed by the second management module; and un-provisioning the second management module after the received workload consumes the resources of the provisioned on-demand compute nodes.

35. A management node in an on-demand compute environment comprising:

a processor; and a computer-readable storage medium having stored therein instructions which, when executed by the processor, cause the processor to perform a method comprising:

receiving a communication from an external compute environment, the on-demand compute environment separately administered from the external compute environment, the external compute environment configured to receive workload for processing from users via a reservation of external compute nodes in the external compute environment, wherein the on-demand compute environment is not a video on-demand server;

based on the communication, spawning a new management module in the on-demand compute environment, in addition to the management module;

provisioning compute nodes in the on-demand compute environment for workload to be managed by the new management module to yield provisioned on-demand compute nodes;

receiving workload from the external compute environment for processing;

communicating the workload to the provisioned on-demand compute nodes, wherein the workload consumes resources of the provisioned on-demand compute nodes; and removing the new management module from the on-demand compute environment after the workload consumes the resources of the provisioned on-demand compute nodes.

36. A compute environment that accesses a separately-administered on-demand compute environment, the compute environment comprising:

a processor; and a computer-readable storage medium having stored therein instructions which, when executed by the processor, cause the processor to perform a method comprising:

transmitting a communication to a management module in the separately-administered on-demand compute environment, wherein the communication causes the management module to spawn a new management module in the separately-administered on-demand compute environment and provision compute nodes in the separately-administered on-demand compute environment for workload to be managed by the new management module to yield provisioned on-demand compute nodes, and wherein the separately-administered on-demand compute environment is not a video on-demand server; and transmitting previously submitted workload to the separately-administered on-demand compute environment for processing, wherein the workload consumes resources of the provisioned on-demand compute nodes via a reservation process, and wherein the new management module is removed from the separately-administered on-demand compute environment after the workload consumes the resources of the provisioned on-demand compute nodes.

* * * * *